Aug. 9, 1966

H. T. JOHNSON ETAL 3,265,946

PLURAL TAPE FED MOTOR CONTROL SYSTEM
WITH TAPE SEQUENCE CONTROLLER

Filed Aug. 3, 1961

Inventors
Harry T. Johnson
Veljko Milenkovic
BY Olson, Mecklenburger
von Holst, Pendleton, & Neuman
Attorneys

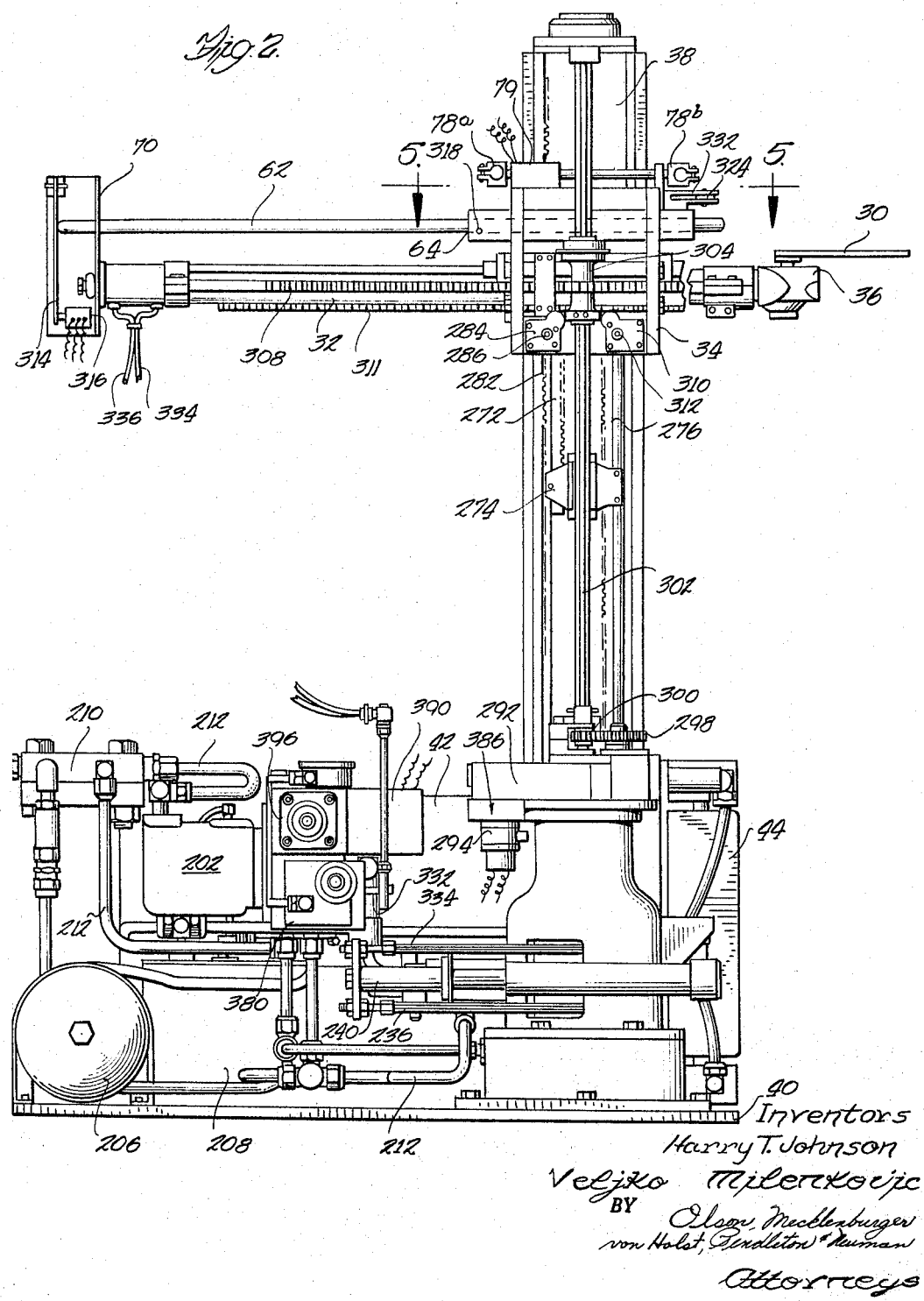

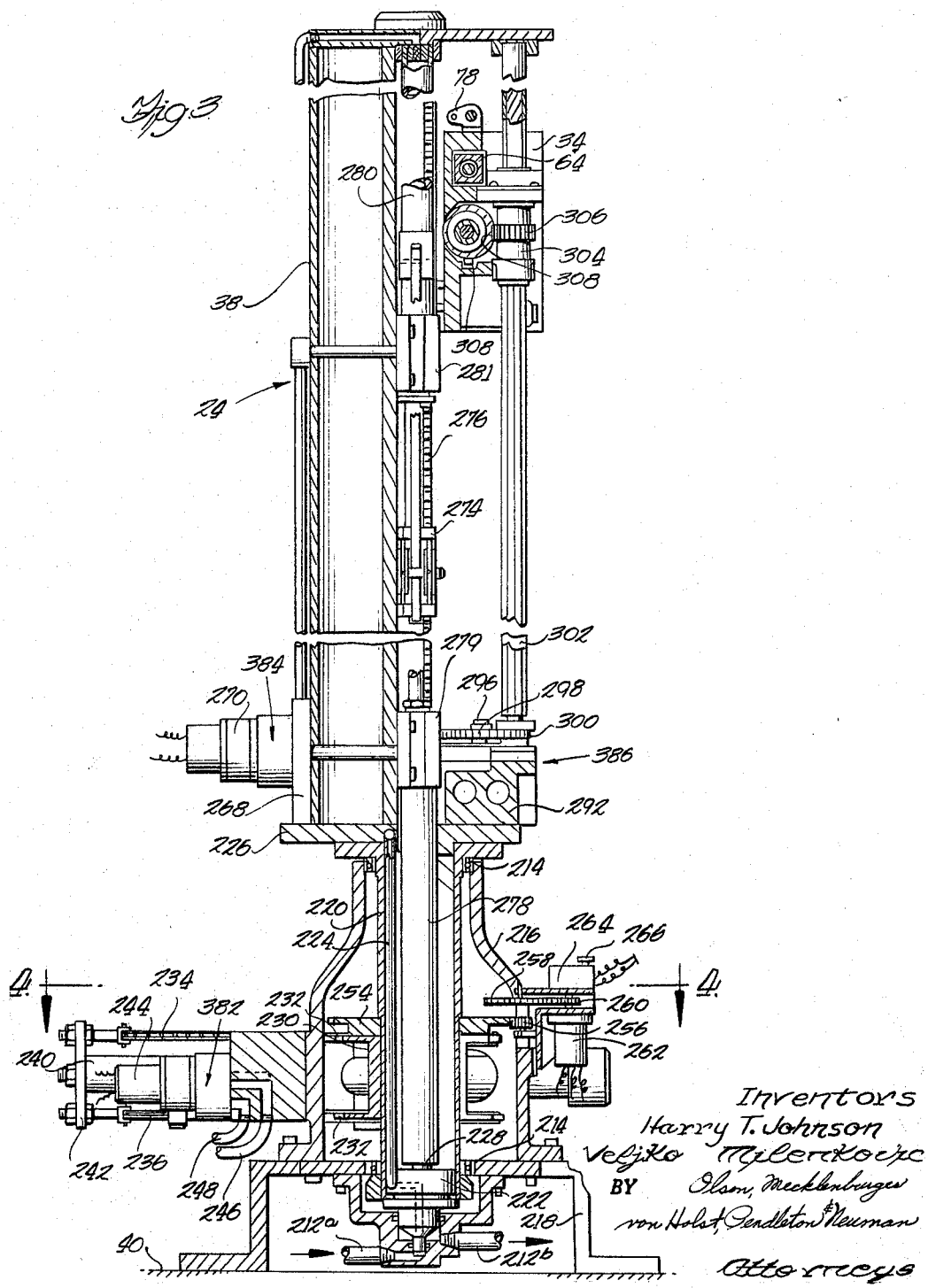

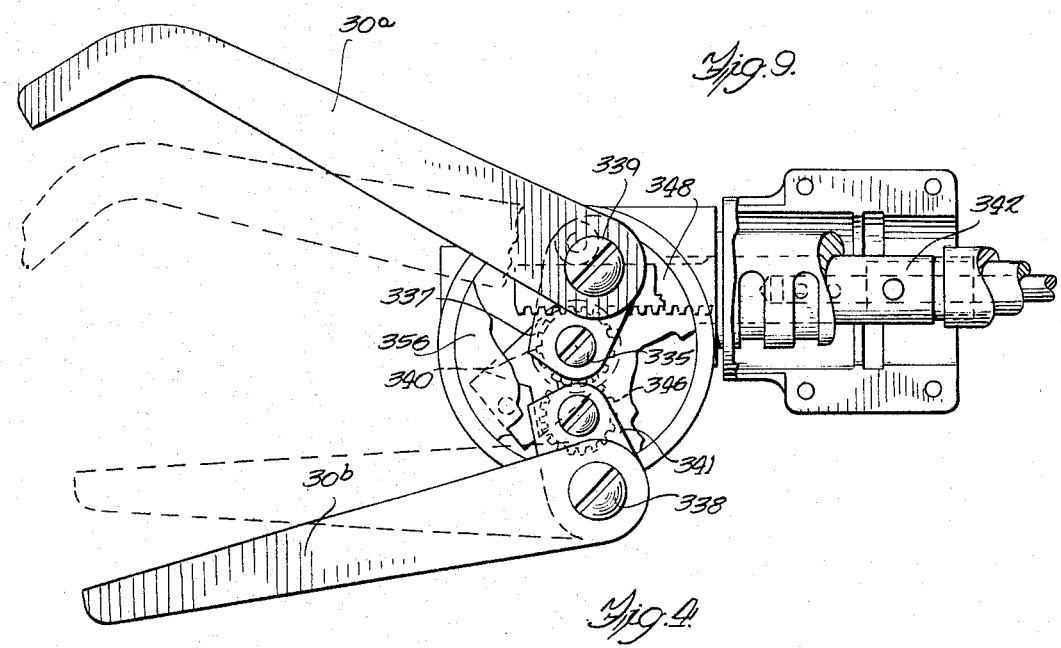
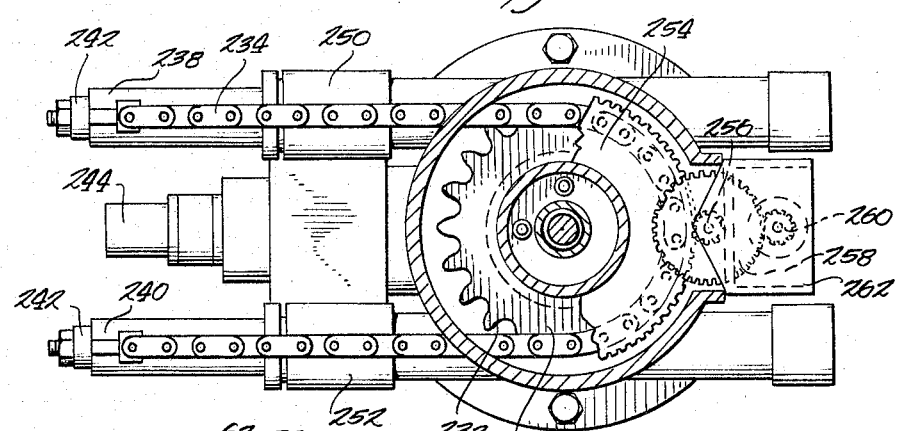
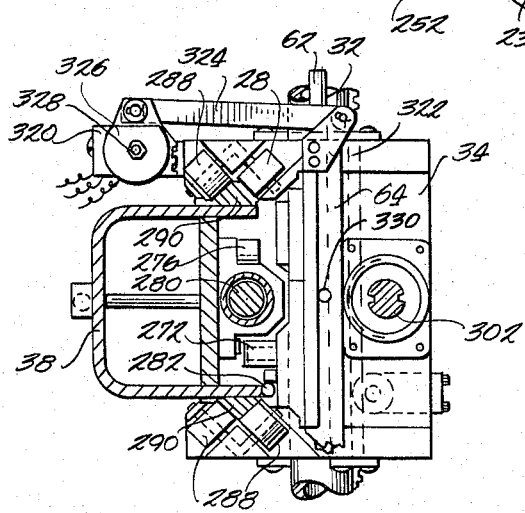

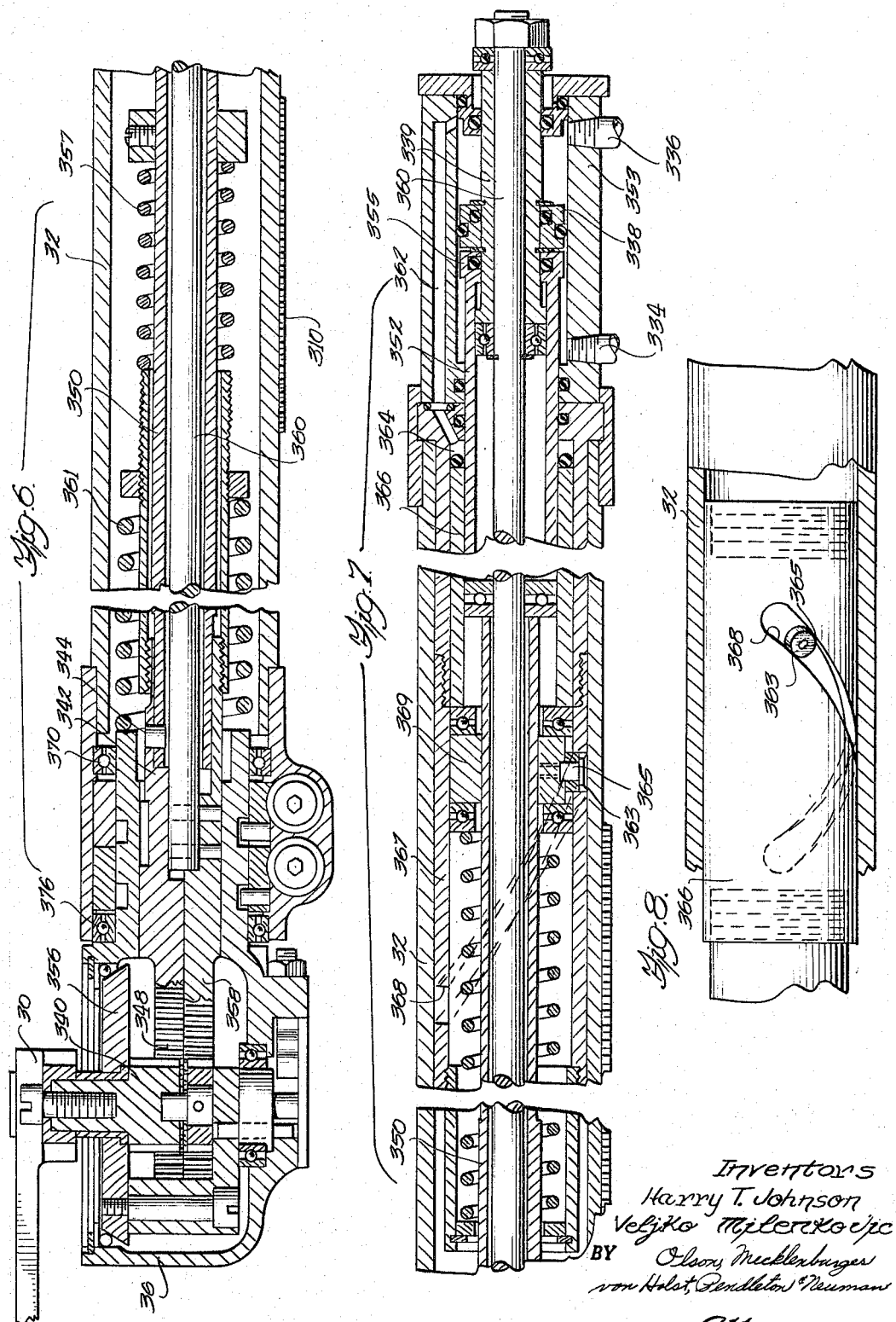

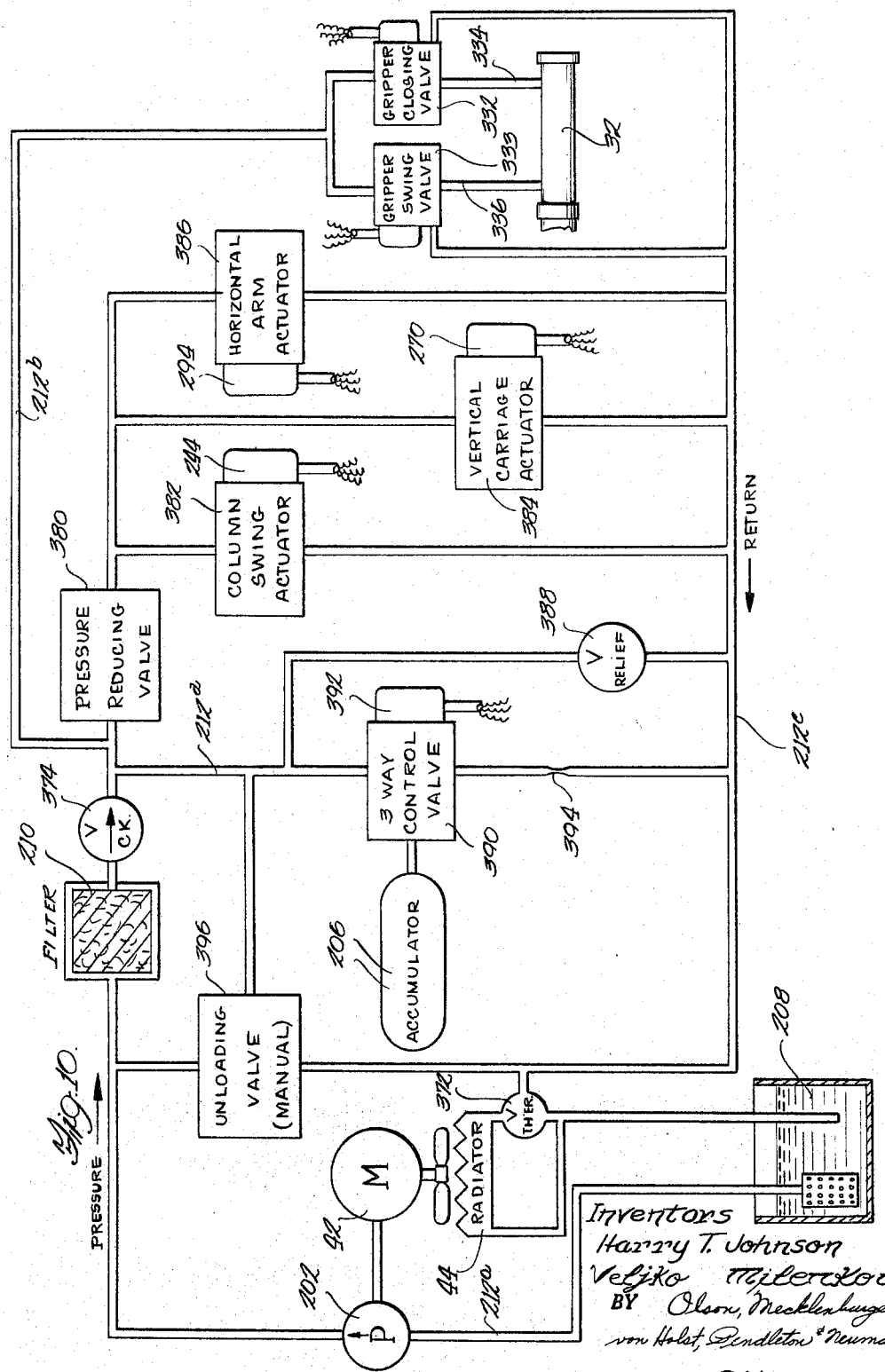

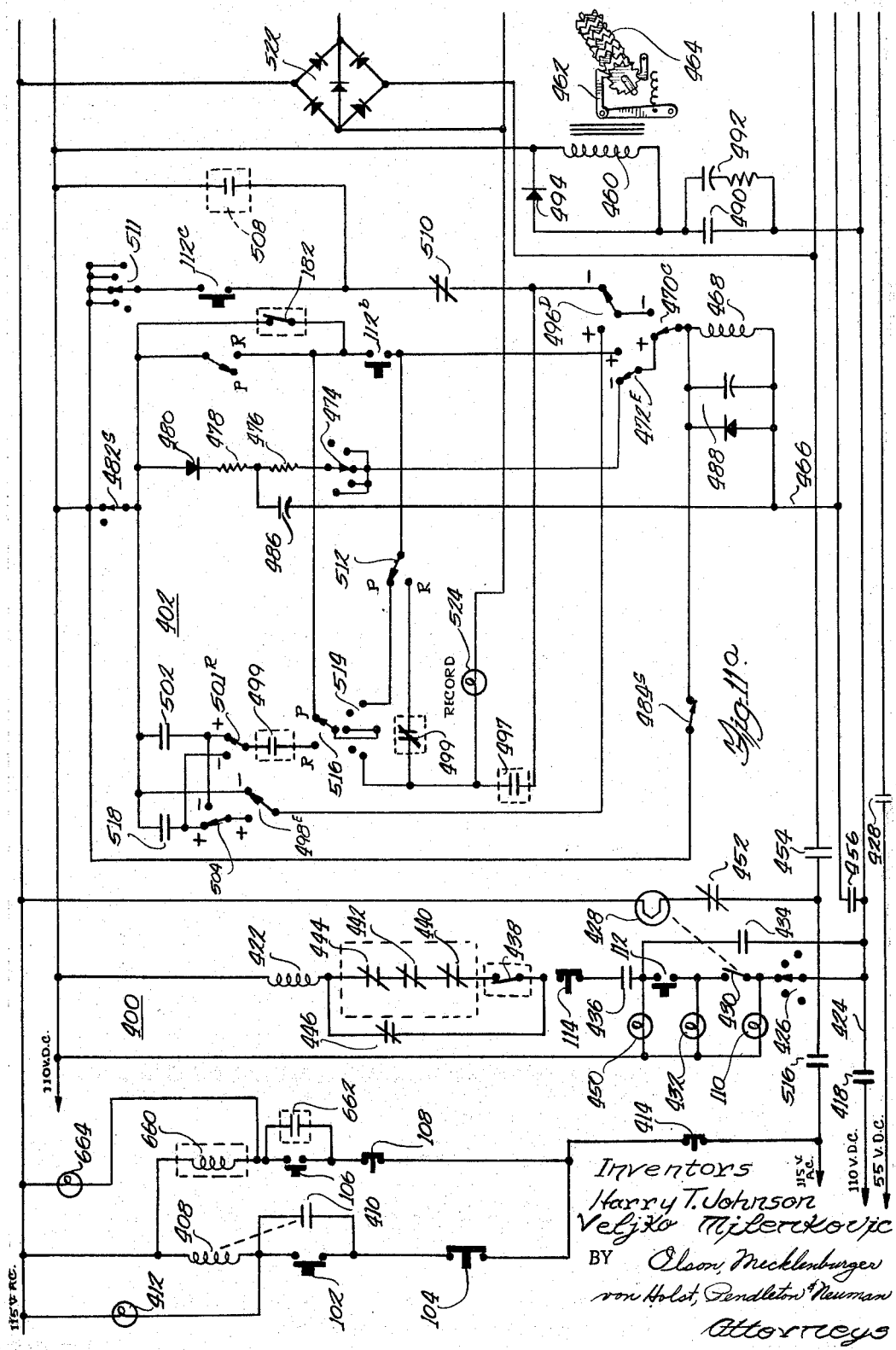

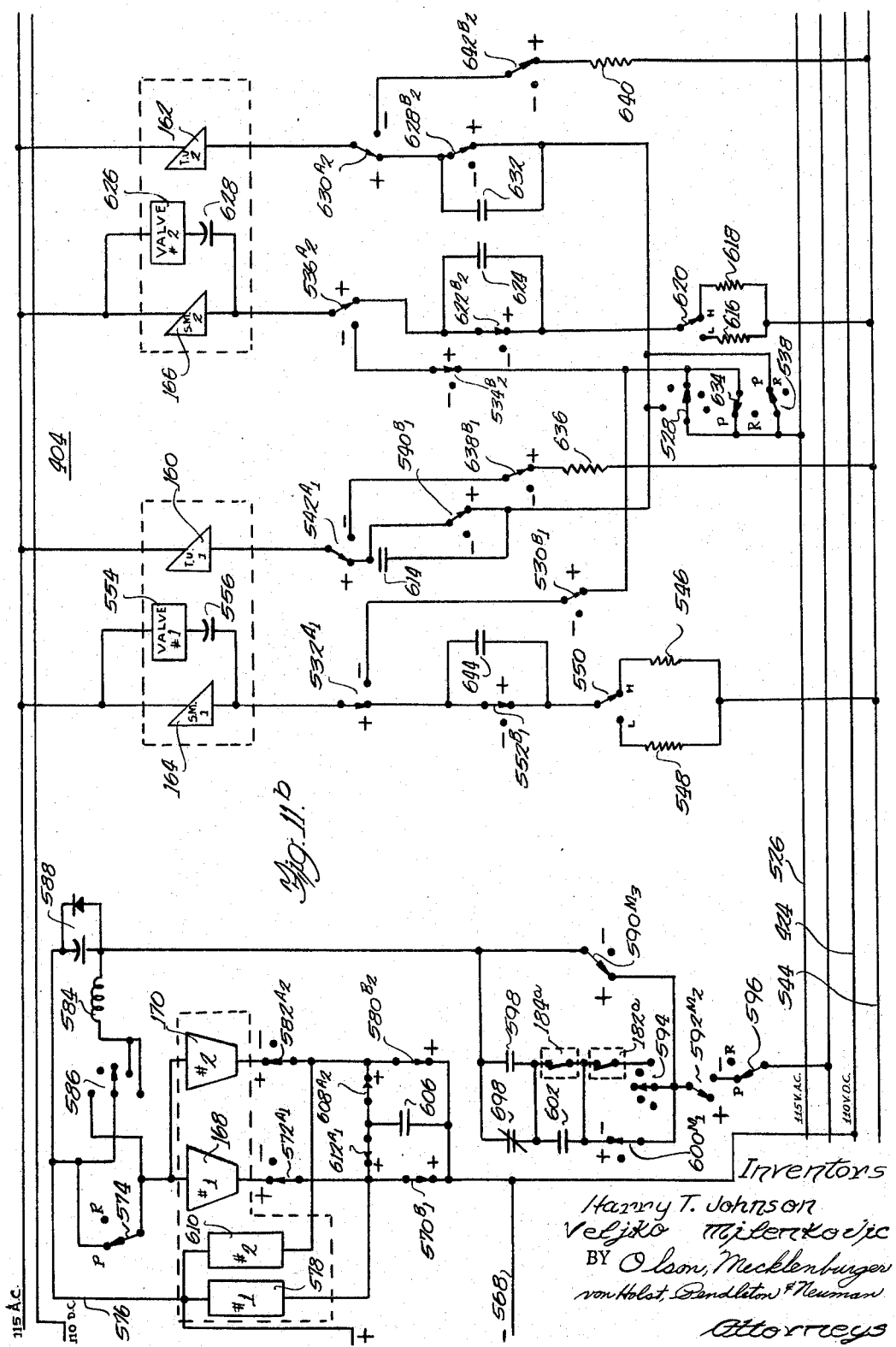

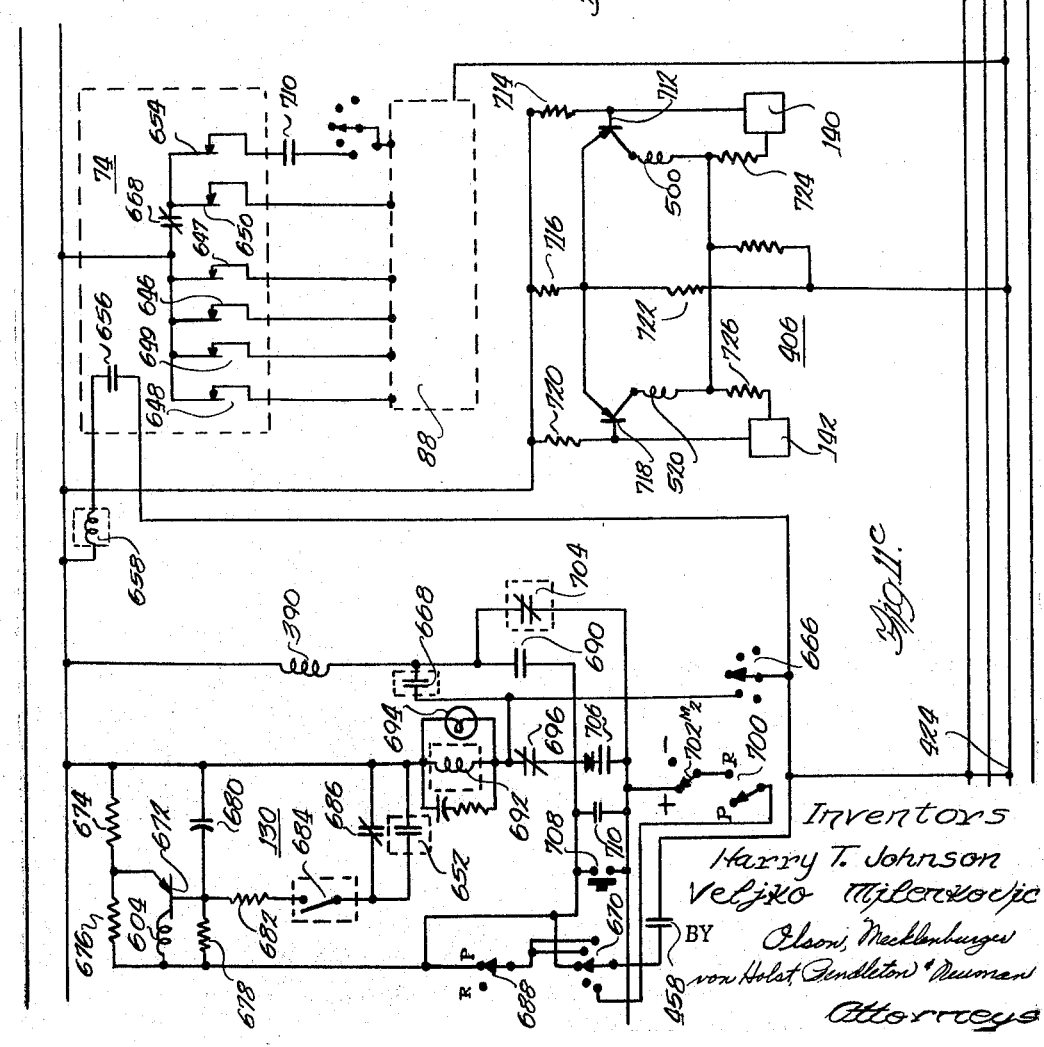

United States Patent Office 3,265,946
Patented August 9, 1966

3,265,946
PLURAL TAPE FED MOTOR CONTROL SYSTEM WITH TAPE SEQUENCE CONTROLLER
Harry T. Johnson, Glenview, and Veljko Milenkovic, Park Ridge, Ill., assignors to American Machine & Foundry Company, a corporation of New Jersey
Filed Aug. 3, 1961, Ser. No. 129,074
26 Claims. (Cl. 318—18)

This invention relates to a sequence control system. More particularly, in one embodiment the invention relates to an improved system for automatically controlling the operation of a work handling machine in coordination with other work handling and work processing devices.

Industry in recent years has employed and is demanding greater use of automatic machines for all types of repetitive processing, machining, work handling, assembling and the like. In order to maintain low costs in mass production the handling and processing of parts by individual workers must be minimized and the use of automatic machines for these purposes increased. In general, machines are capable of operating at greater speed and with greater efficiency than the individual worker but have in the past lacked several of the important characteristics of manual workers, namely, the ability to be quickly programmed, i.e. learn the specific motions and operations which must be repeated, the ability to recognize anomalies or discrepancies in the associated machines, the product or the processing, and the ability to accurately repeat a series of operations involving the handling of a product between machines or operations.

Very substantial advances in the techniques of automatic machines have already been attained. Thus automatic screw machines are capable of continuously making a single relatively complex product where bar stock or the like is continuously fed to the machine. This is a simple form of automatic machine in which the sequence of operations can be mechanically programmed by presetting cams and levers and workpiece handling is facilitated by using bars or rods of raw material.

Another advance in automatic work processing has been the operation of machines such as lathes and milling machines in response to a prepared program. The program may be recorded in any conventional manner, the most typical being in the form of a punched tape or magnetic tape signals. In automatic machines of this type the time for processing a given part is usually relatively long and a worker loads the machine with raw material and sets the lathe or the like into operation. Thereafter the machine in response to the intelligence on the tape will complete the processing of the part without further attention, after which the machine is manually unloaded and reloaded with raw material and the record medium reset.

There has been a need in industry for a machine having greater versatility and adaptability. More particularly there has been a need for a machine which can receive a program of information, can remember the program, can be ready instantaneously to repeat the program any desired number of times, has great freedom of action in many modes or degrees of freedom, can check the condition of associated equipment or the availability of parts or raw material, and can perform other safety checks while in operation. Such a system may be adapted to many existing semiautomatic or so-called automatic machines for work handling, processing and the like. To handle and operate upon a workpiece a system must be provided for handling the workpieces between operations or machines while integrating and coordinating the various operations or machines. Such a sequencing system must provide safety factors, check points, timing and sequence control and accurate repeatability so that handling and processing of the workpieces by a series of machines, conveyors, tools and the like can be accomplished with reliability.

One machine which has been developed for handling or operating upon workpieces in a predetermined and preprogrammed manner is described and claimed in the copending application of Johnson, Milenkovic and Walters, Ser. No. 43,090, filed July 15, 1960 and assigned to the same assignee of the instant application. The work handling machine described in that application has great flexibility and versatility in carrying out either simple or complex movements and operations. The machine operates in three basic modes and has three basic degrees of freedom. It has in addition to the three basic degrees of freedom three additional degrees of freedom whereby any normal manipulation which could be accomplished by an individual can be performed by the machine within its range or reach. Once programmed, the machine moves in response to information recorded in four separate channels, three of which are dedicated to the three basic degrees of freedom. The fourth contains sequencing information for partial control of the sequencing system and operating signals for controlling the machine in the remaining three limited modes.

In the device described in the application mentioned above, a pair of grippers in the nature of a jaw are opened and closed, rotated and turned in a wrist-like action. The grippers are mounted on a horizontal arm which is in turn mounted on a vertical column through a carriage. The horizontal arm is free to move axially in the carriage and the carriage is free to move vertically on the column. In addition to the horizontal and vertical movements, the column is free to rotate through a substantial angle on its base. Thus the three basic degrees of freedom are the horizontal, vertical and swinging motion of the grippers and supporting arm, while the opening and closing of the grippers and the wrist-like rotation and pivoting of the gripper mount constitute the limited modes of freedom.

These modes permit virtually unlimited movement and spacial versatility within the range of the machine.

In the particular work handling machine described in application S.N. 43,090, a hydraulic system drives the machine through all modes. The movement of the grippers in the three limited modes is on an on-off basis between adjustable stops. In the three basic modes movement is controlled by hydraulic valves which are electrically actuated from a servo-amplifier. In playing back a recorded program a signal from a recorded tape is compared with a signal from a resolver associated with each mode and a difference or error signal utilized to move the machine, altering the resolver output until the error attains a null value. When recording the hydraulic valves are under the control of differential transformers. The resolvers also provide an output signal during the programming or recording sequence and these signals are recorded for subsequent playback. The tape recorded signal in a preferred embodiment is in the form of pulse modulation which can be accurately interpreted by sensing circuits to position the arm and grippers within desired machine tolerances.

To properly operate the machine described briefly above and described in detail in application S.N. 43,090 from the tape recorded information a control system having many unique and novel features is required. Such a control system has a wide variety of uses and applications as will become obvious from the following description and from the claims. The control system may be used with the particular recording system and work handling machine described above, but it is equally useful with any system of information recording and with any machine intended for repetitive operation. The following description of the sequence control system will be directly oriented to the work handling machine shown in application S.N. 43,090 merely as one specific embodiment of the invention and one particularly useful adaptation of the system whereby proper predetermined continuous control, operation sequencing, synchronism, anomaly checking, and playback in multiple modes are provided with virtually instantaneous programming or preparation of command information.

It is one very important object of this invention to provide a sequence control system for insuring accurate repetitive operation of any machine, process, or system from prerecorded information.

It is another object of this invention to provide an improved sequence control system for use with an automatic machine which will permit instantaneous programming and playback whereby the machine will have heretofore unknown adaptability and versatility.

It is still a further object of this invention to provide an improved sequence control system of greatly increased reliability whereby associated equipment may be accurately operated through prerecorded repetitive cycles with a wide margin of safety.

It is another object of this invention to provide an improved sequence control system which will insure synchronization of two or more instrumentalities such as work handling machines and work processing machines.

It is another object of the invention to provide in a sequence control system means for detecting any anomalies in the operation of any of the associated machines and to avoid damage to the machines or work product.

It is still another object of this invention to provide a novel sequence control system of relative simplicity in view of its great adaptability and versatility in association with many work handling and work processing machines.

Further and additional objects of this invention will become manifest from a consideration of this description, the accompanying drawings and the appended claims.

In one form of the invention the sequence control system is employed in direct association with two magnetic tape recorders, associated amplifiers and controls, a work handling machine and a work processing machine such as a punch press or the like. The work handling machine is manually driven through a single operating cycle during which any desired work handling operation is performed. For example the machine may be manually driven through a cycle in which grippers forming a part of the machine pick up a workpiece from a conveyor, translate it both vertically and horizontally, turn it, rotate it, and place it on the bed of a punch press, after which the punch press will perform an operation upon the part. The work handling machine may then pick up the workpiece and place it on a further conveyor. Through the sequence control system of this invention such a manually initiated program may be recorded on two magnetic tapes simultaneously with any additional desired control and safety data also recorded.

By proper manipulation of the controls on the sequence control system sequential playback of the two tapes is initiated whereby the work handling machine in predetermined coordination with the work processing machine and incoming and outgoing conveyors may repetitively perform the same operation that was manually initiated in the first instance. The sequence control system may provide a plurality of operational check points and delay or terminate operation of the apparatus in the event that any anomaly or irregularity is detected. Such irregularities may include lack of synchronization of any associated instrumentality or lack of workpieces in the supply lines.

For a more complete understanding of the invention reference will now be made to the accompanying drawings wherein:

FIG. 2 is a side elevation of one work handling machine for use with the sequence control system of this invention;

FIG. 3 is a partial sectional view of the vertical column of FIG. 2;

FIG. 4 is a partial cross sectional view of the column of FIG. 3, taken on the line 4—4;

FIG. 5 is a sectional view of the column of FIG. 2, taken on the line 5—5;

FIGS. 6, 7 and 8 are sectional views of the horizontal arm forming a part of the work handling machine of FIG. 2;

FIG. 9 is a fragmentary view of the horizontal arm showing the gripper mechanism;

FIG. 10 is a hydraulic circuit diagram for the machine shown in FIG. 2;

FIGS. 11A, 11B and 11C are the complete circuit diagram of the sequence control system of this invention and shall be considered together;

FIG. 12 is a chart of the various cam positions for the cam switch shown in FIG. 11A, and FIG. 13 is a chart of the operation of the two tape recording mechanisms for the various cam positions set forth in FIG. 12.

Figure 1:
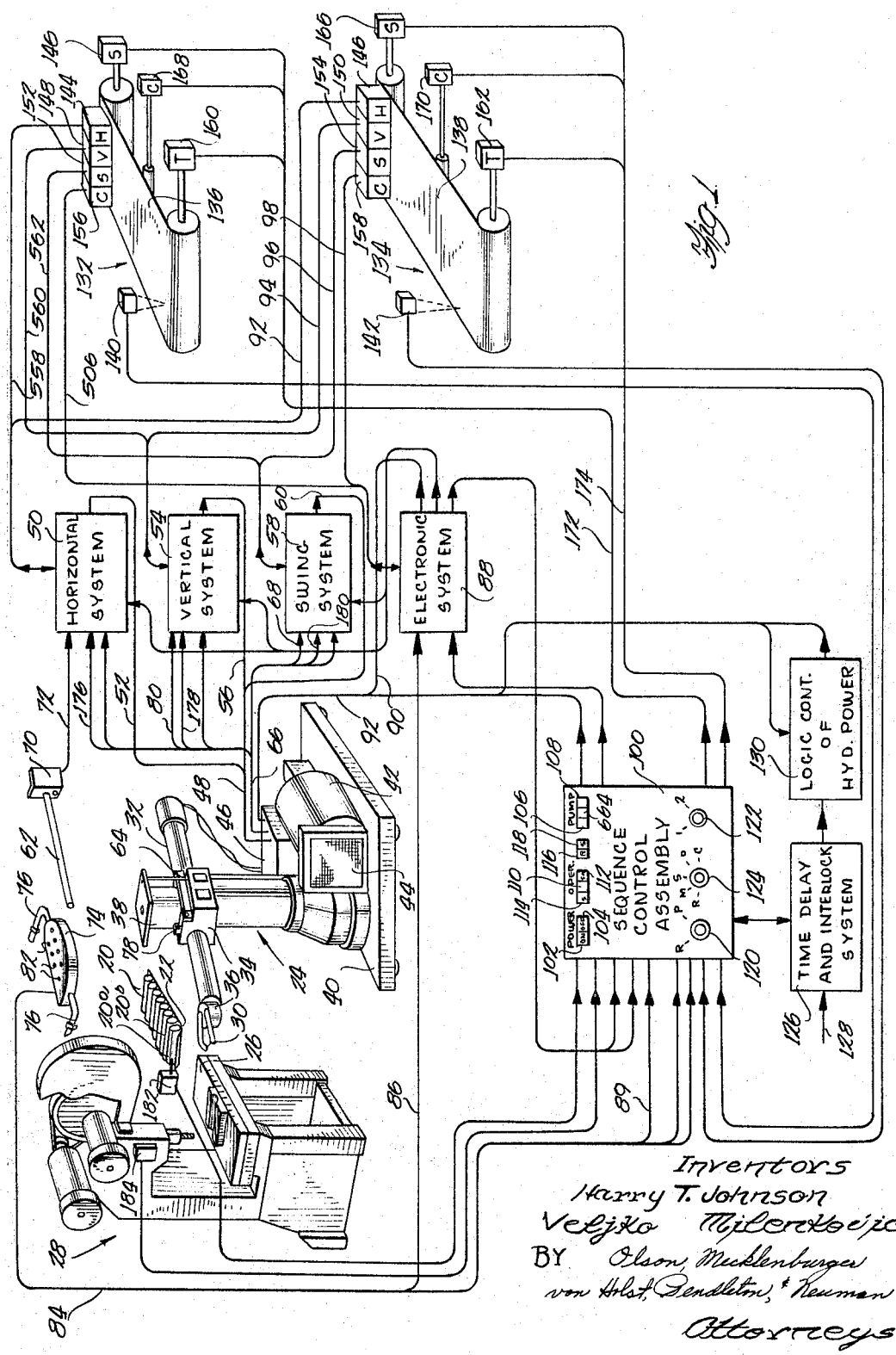
FIG. 1 is a combined block and perspective diagram generally indicating the elements of the complete system and the manner in which they are interrelated.

Referring now to the drawings and more particularly to FIG. 1, one complete system employing the sequence control of the instant invention is illustrated in diagrammatic form. The particular system described is adapted to individually manipulate piece parts sequentially, place them in a processing machine, perform an operation on them and remove them from the machine. This would be one typical use of the instant invention although it should be understood that the invention has great versatility and is in no sense limited to the associated equipment or the particular use described.

General description of system

In FIG. 1 the illustrative workpieces are cylinders 20 which are delivered in a row along a conveyor 22. The work handling machine 24 is diagrammatically illustrated in direct association with the row of pieces 20 and is adapted to grasp individual cylinder 20a and place it on the bed 26 of a punch press 28. The first step in initiating a new operation is to place the machine 24 in propinquity with the source of parts and the processing machine. The work handling machine 24 can be controlled either manually or automatically and has a pair of grippers 30 which actually engage and manipulate the workpieces 20. When operated manually, the keyboard 74 and the control stick 62 are secured in place on machine 24. When controlled automatically, one of the tape mechanisms 132 or 134 is employed to generate control signals through the associated circuitry shown in the various blocks to actuate machine 24. Sequence control assembly 100 determines and controls the sequence of operations and type of command signals applied to the machine.

The grippers 30 of machine 24 are supported at one end of a horizontal arm 32 which is mounted for axial movement in a carriage 34. The mounting 36 for the grippers 30 contains mechanism for opening and closing the grippers 30 and is also mounted for rotation about the axis of support 36 and about the axis of arm 32. The carriage 34 which supports horizontal arm 32 is mounted for vertical movement on column 38 and column 38 is in turn rotatably mounted in appropriate bearings on machine base 40. Also disposed on machine base 40 are the necessary auxiliary devices for operating and controlling the machine 24. In the illustrated embodiment these include an electric motor and hydraulic pump 42, a hydraulic fluid cooling radiator 44 and various electronic controls contained within the area 46. As will be described more fully hereinafter, the motive power for all movements of the machine is transmitted and controlled hydraulically by valves contained in various parts of the machine. These valves are electrically operated and controlled by input signals transmitted to the machine through appropriate cables.

In the diagram of FIG. 1 no attempt has been made to illustrate all of the various electrical and hydraulic connections of the system but they are merely illustrated diagrammatically as cables. The precise locations of the various hydraulic valves and electrical inputs to machine 24 will be seen in the more detailed views. Thus in FIG. 1 the signals for controlling the hydraulic valves for the basic three modes of motion are applied to the machine through cable 48. Horizontal motion of arm 32 and carriage 34 is controlled by the output of the horizontal electronic system 50 through cables 48 and 52. Vertical operation of the carriage 34 on column 38 is controlled by vertical system 54 through cables 48 and 56 and the swinging motion of column 38 about its axis on base 40 is controlled by swing system 58 through cables 48 and 60. Each of the three systems 50, 54 and 58 is basically an electronic amplifier forming a part of a closed circuit servomechanism. In each mode the amplifier output is an amplified error signal which actuates the associated hydraulic valve. The amplifier input is the voltage generated in a differential transformer or a voltage which is a comparison of a tape recorded signal and a machine resolver output. Each of the three systems also includes many switches and controls, detectors, signal shaping circuits, gates and the like to generate the proper electronic signals for operation of the machine when in the various operating sequences and to switch inputs and outputs in response to control signals from the sequence control assembly 100. The sequence control assembly 100 comprises the control center for the entire system. In actual construction the sequence control assembly 100 may be incorporated in a single rack or console along with the horizontal, vertical, swing and electronic systems. The sequence control assembly includes several manual controls as shown diagrammatically in FIG. 1. "POWER ON" push button 102 when actuated applies power to certain portions of the system and makes power available for the remainder, as will be described in greater detail hereinafter. "POWER OFF" push button 104 removes power from the electrical system, "PUMP ON" push button 106 energizes the hydraulic pump motor through appropriate relays and controls, and "PUMP OFF" push button 108 de-energizes the pump motor. When 102 has been actuated and a predetermined time elapsed a start-operate light 112 is illuminated, indicating that the device is prepared to start operation. Caution light 110 will also be illuminated whenever knob 124 is in the START position. Operation is then commenced by depressing "START OPERATE" button 112 and terminated by depressing "STOP OPERATE" button 114. Light 116 is illuminated when the sequence control system is conditioned for recording and light 118 is illuminated when the system is conditioned for manual or stick operation. Three additional controls are provided on the panel of sequence control 100. Knob 120 controls a plurality of sequence switches and permits selection between a programming or recording and a run or playback condition. Knob 122 is a speed selector for operation of the tape recorders and associated equipment for a reduced time base, and knob 124 selects one of five operations. These five operations in clockwise order are recording, manual, start or home position, a single playback position and a continuous playback position. Operation in each mode is in response to any one of three possible inputs, namely, tape commands, homing signals, and manual control transformer signals.

When operating the machine 24 manually the manual stick 62 is inserted and fixed in a pivotally mounted support 64. Movement of the stick 62 to the left or the right moves pivoted support 64 which in turn shifts the relative positions of the core and windings of an associated differential transformer. The stick and support are normally spring tensioned to a neutral position where the core is centrally located in the differential transformer and thus in a null position with no electrical output from the device. If the stick 62 is shifted to the left or the right a signal is generated in the transformer which is transmitted through cables 66 and 68 to the swing system 58. The swing system 58 amplifies and operates upon the transformer signal and applies it through cables 60 and 48 to a swing servo-valve which actuates the column and moves it in the appropriate direction with respect to the base 40 to follow the stick command. Similarly if the stick 62 is moved axially either toward or away from the grippers 30 a signal is generated in the stick mounting 70 which contains a differential transformer similar to that described above and the signal is transmitted through cable 72 to the horizontal system 50 where the signal is amplified and operated upon in an appropriate manner. The signal is then applied through cables 52 and 48 to a servo-valve which will move the arm 32 in an appropriate direction in carriage 34 to follow the stick command.

Keyboard 74 is also attached to the machine 24 during manual operation. The keyboard includes a plurality of switches 82 which will be described below and is mounted on a pair of shaped rods 76. The rods 76 are received in appropriate pivotal mountings 78 on the carriage 34. The mountings 78 are appropriately mounted for limited movement about an axis parallel to arm 32 and when so moved actuate a differential transformer such as those already described. Thus when the keyboard 74 is raised or lowered from a normal intermediate position, appropriate signals are generated in the differential transformer and are transmitted through cables 66 and 80 to vertical system 54. The amplified and shaped signal output from vertical system 54 is applied through cables 56 and 48 to a vertical servo-valve which actuates pistons to raise or lower carriage 34 on column 38 in direct response to manipulation of keyboard 74.

Thus an operator with one hand deployed on stick 62 and the other hand on keyboard 74 is able to control the position of grippers 30 within a predetermined range without limitation by moving the grippers in the three modes of motion, namely horizontal, vertical and swing. Thus he can position the grippers in direct proximity to workpiece 20a and move the grippers through any arbitrary pattern of motion to a position adjacent punch press bed 26. The operator can then move the grippers to still another position adjacent a further conveyor and return the grippers to their initial position adjacent the workpiece 20a. To perform the desired operations all that remains is the manipulation of the grippers 30 themselves. This is accomplished through certain push buttons 82 disposed on panel 74. Upon depressing one of the push buttons 82 the grippers close to engage a part. On depressing an adjacent button the grippers open. This is accomplished through cables 84 and 86 which apply signals to an electronic system 88 that in turn through cables 90 and 92 energize appropriate solenoid valves in the machine base. If, in addition to the mere opening and closing of the jaws 30 wrist action is required, this is accomplished by depressing still another switch button 82 which through cables 84 and 86 actuates other components in electronic system 88 to operate still another solenoid valve in the base 40 and thus produce the necessary turning or wrist action of the grippers 30. A manual operator thus controls the operation of the work handling machine in three basic modes plus three auxiliary modes for complete versatility of gripper action. Additional push buttons 82 are provided on keyboard 74 to place coded information on the tapes during recording and to begin and terminate a recording cycle. In one alternate construction the Begin-End push button and the check point or end of sequence push button are placed upon the column 38 to require release of the keyboard 74 prior to actuation of those buttons.

Through the controls described it is possible to duplicate with machine 24 as it is shown in FIG. 1 any manual operation whether simple or complex involving the handling or positioning of a piece part. By the substitution of other devices for the grippers 30, a wide range of other handling, manipulating and processing operations could be performed by machine 24. Thus a tool might be incorporated in place of the grippers 30 to operate on parts passing along a conveyor or an assembly line.

When the operation selector 124 is in the "RECORD" position the manually executed program is interpreted in electrical signals which are magnetically recorded on tapes 136 and 138. In either the "ONCE" or "CONTINUOUS" positions the tape mechanisms control machine 24 to the exclusion of manual control but including homing control during tape transition.

Each tape mechanism is a four channel device having four electrically independent recording heads and associated mechanism for generating four isolated information signals. The tapes 136 and 138 have transparent leaders at the beginning thereof which can be sensed by appropriate photoelectric sensing devices 140 and 142. The tapes 136 and 138 are, with the exception of the leaders, opaque and coated with an iron oxide in the conventional and well known manner. The horizontal heads 144 and 146 are connected to horizontal system 50 through cables 558 and 92 respectively, vertical heads 148 and 150 are connected to vertical system 54 through cables 560 and 94 respectively, swing heads 152 and 154 are connected to swing system 58 through cables 562 and 96 respectively, and control heads 156 and 158 are appropriately connected to electronic system 88 through cables 506 and 98. The control heads 156 and 158 are designed to record a continuous reference signal which serves as a reference standard in playback. The reference signal may be modulated in various ways to control gripper action as well as various sequencing phenomena. If desired a separate fifth channel may be used for the control pulses. The tape recorders 132 and 134 are provided with take up motors 160 and 162, supply motors 164 and 166 and capstan drive solenoids 168 and 170. Drive solenoids 168 and 170 shift the respective capstan roller against a shaft connected to a constant speed motor (not shown). The take up, supply, and capstan drives are controlled by the sequence control assembly 100 through cables 172 and 174.

When manual operation of the machine 24 as described above is performed with knob 124 in the M or manual position the remainder of the system, namely, the tape recorders and a major portion of the sequence control assembly would remain quiescent in accordance with the predetermined conditions of certain elements of the sequence circuit 100. If it is desired to make a record of the manual program for subsequent repetition, operation knob 124 and sequence selection knob 120 are turned to the R or record position. In that position both tape mechanisms are conditioned for recording signals in the four channels in response to operation of the machine 24. Upon depressing the Begin-End button 82 both tape mechanisms begin operation and are connected to an output from each of the amplifier systems 50, 54 and 58. Differential home transformers are mounted on the machine 24 and manually adjusted to provide a unique predetermined orientation in space for the grippers 30 in each of the three basic modes. When the knob 124 is in the start position and the operating button 112 is depressed, the machine will move to this one predetermined home position and normally all operating sequences begin from this position. The home transformer signals are transmitted to the respective mode systems 50, 54 and 58 through cable 66 and cables 65, 67 and 69. The homing signals are amplified and applied to the respective servo-valves through cables 52, 56 and 60 to drive the grippers to the preset HOME position and produce null voltages in the home transformers.

In setting the machine into operation in a new environment the operator moves the base 40 to an appropriate position relative to the processing machine 28 and the conveyor 22 after which he actuates power switch 102, pump switch 106 and after a predetermined time delay start switch 112. The machine would immediately move to the home position provided knob 124 was in the S or start position. The operator then moves the knob 124 to the left to the record position, depresses a "DEADMAN" switch to transfer control from the home transformers to the manual transformers and begins manipulation of the machine by means of stick 62 and keyboard 74. This involves moving the grippers in the three basic modes if necessary to the precise position where the grippers can engage the piece part 20a. The operator then depresses the appropriate button 82 to pick up part 20a, manipulates the work handling machine 24 to place the part 20a in the punch press 78, permits the work processing machine 28 to work upon it and then removes the part. When the grippers 30 with the part 20a approach the bed 26, the operator must actuate one or more of the buttons 82 as required to rotate or turn the grippers 30 and to open them releasing the piece part on the bed.

When the buttons 82 are depressed to perform the desired operations the signal is applied through cables 84 and 86 to the electronic system 88 which in turn generates predetermined modulation in the reference signal and applies the modulated reference signal to the control heads 156 and 158 to generate magnetic impressions in the fourth tape channel. Once the piece part has been removed from the bed 26 and placed in the continuing conveyor the operator may depress still another button 82 indicating that the sequence is ended, whereby the control assembly 100 will switch from the manually actuated differential transformer to the adjustable space oriented home transformer upon release of the manual button whereby the machine 24 will automatically return to the predetermined home position immediately adjacent the new workpiece 20b. As the machine 24 is manipulated electrical resolvers forming a part of the machine generate unique signals representing each of the three modes of freedom which are transmitted through cables 66 and cables 176, 178 and 180 to the respective amplifier systems 50, 54 and 58. These signals are appropriately amplified and reformed into spaced impulses in the nature of pulse time modulation and the spaced impulses are periodically recorded in the respective channels on the two tapes 136 and 138 simultaneously.

Two additional sequence controlling features are provided in the instant embodiment, namely an "END OF PROGRAM" and an "END OF SEQUENCE" signal. A sensing device 182 is associated with the incoming workpieces 20 to determine that a workpiece 20a is in position for the gripper 30. The sensing device 182 may be a photoelectric device, a mechanical feeler, as illustrated, or any other appropriate mechanism. It is desirable in each repetitive cycle of the machine 24 that a check be performed to determine that a workpiece is available and if not it is important that the machine be stopped and held in readiness for further operation when parts are available. To effect this sequence check at the end of the program a signal is recorded on tapers 132 and 134 by the depression of a push button 82. Depression of the appropriate push button completes a circuit in electronic system 88 through cables 84 and 86. The electronic system is adapted to modulate the reference signal and make appropriate effects on the tapes 132 and 134 through heads 156 and 158. In playing back the tape recorded command signals, the end of program signal is detected by heads 156 and 158 and applied to electronic system 88 where it is amplified and sensed and employed to control relay contacts which in turn condition the sequence control 100 to respond to the conditions of sensing device 182. If, when the end of program signal is sensed, device 182 indicates lack of a further workpiece, the input to each of the amplifier systems 50, 54 and 58 is automatically switched from the associated tape heads to the homing differential transformers to hold the machine in the home position until the anomaly of a missing part is corrected. Also the various tape motors are immediately de-energized and the brakes applied so that upon elimination of the anomaly normal operation in response to tape signals can be immediately initiated.

A second check point is provided by the sensor 184 which may be used to determine that the work processing machine 28 is in proper condition to receive a workpiece 20 in the course of an operating sequence. Thus immediately prior to manipulating the machine 24 to place a workpiece 20 on the bed 26 the operator will release both keyboard 74 and stick 62 to stop motion of the machine in the three basic modes and record a signal representing constant positions. He will then depress another marked push button 82 on panel 74 which will through cables 84 and 89, control assembly 100 and electronic system 88 modulate the reference signal in still a different manner and produce an appropriate magnetic record through control heads 156 and 158. The operator will then resume normal control in the three operating modes and ultimately return the machine 24 to the home position. In playback during repetitive operation of the machine in response to the tape recorded signals, sensing of the check signals by head 156 or head 158 will produce a signal in electronic system 88 to complete a checking circuit. This circuit includes sensor 184 and thus senses the condition thereof indicating the readiness of the machine 28 to receive a further workpiece. In the event that the machine is not in condition to receive a part at the time that the check signal is sensed, the work handling machine 24 will be locked in the position in which the operator momentarily stopped during the recording operation, all hydraulic units will be locked, the tape mechanisms will be stopped, and the system held quiescent until the work processing machine is resynchronized. When the sensor 184 indicates synchronization, the tape mechanisms will be re-energized and after a short time delay during which the tape attains operating speed, the machine 24 will resume normal operation.

As will be clear from the foregoing description, during a recording operation the two tapes are energized simultaneously and record identical programs. At the end of the recording cycle the knob 124 is moved to either the once or continuous playback positions and the knob 120 is switched to playback. One or both tape mechanisms are rewound in preparation for playback operation. Upon depressing the start button 112, one of the tapes will begin operation providing all necessary command and control signals for operation of the machine 24. Upon completion of one complete operating cycle the end of program signal which was impressed upon the tapes will actuate the control assembly 100 through a series of steps during which control of the machine 24 is switched from one tape to the other with an intermediate period of home transformer control during which the anomaly check is performed. Thereafter the exhausted tape is automatically rewound until the photoelectric device 140 or 142 senses the transparent leader, after which the tape is stopped in preparation for the next complete sequence of operation.

*The work handling machine*

To better understand the operation of the sequencing system the machine with which the system is used in the described embodiment is illustrated in FIGS. 2–10 and will be described hereinafter. However, the following description is only as complete as is required for an understanding of the instant invention and for a full disclosure of the particular machine reference should be made to copending application, S.N. 43,090, now Patent No. 3,212,649.

Referring specifically to FIG. 2 the control stick 62 is shown in place on the support 64 which is pivotally mounted on horizontal arm 32 while the keyboard 74 which is received in brackets 78a and 78b is not shown in place. However, vertical movement of keyboard 74 produces rotation of brackets 78a and 78b which produces appropriate displacement signals in manual transformer 79. As already described the horizontal arm 32 is supported for longitudinal movement in a carriage 34. Carriage 34 is vertically movable on column 38 which is in turn rotatably mounted on base 40. Also mounted on base 40 are a motor 42, a pump 202, a radiator 44, an accumulator 206, a reservoir 208 and a filter 210 to complete the hydraulic circuit illustrated in FIG. 10. These various hydraulic elements are appropriately interconnected by piping 212. The machine is built with a closed hydraulic system which circulates fluid continuously while providing required pressure for the various operating mechanisms as will be described with respect to FIG. 10. The various operating mechanisms including mode movement and gripper actuation are controlled by servo and solenoid valves respectively.

As best shown in FIG. 3, the column 38 is rotatably mounted through bearings 214 on a housing 216 which is permanently secured through a platform 218 to base 40. A central sleeve 220 extends through the housing 216 and contains hydraulic lines for fluid flow to the various control devices. A pipe 212a provides fluid under pressure which flows through a swivel head 222 and a tube 224 into a manifold 226. Return flow is through a central tube 228 to return conduit 212b.

A drive gear 230 having two spaced sprockets is secured to cylinder 220 and provides the input for swinging motion of column 38. As illustrated in FIG. 3 and in somewhat greater detail in FIG. 4 gear 230 has two spaced sets of teeth 232 which receive link chains 234 and 236. The two ends of chain 234 are secured to tie bars 242 which are driven by movable piston portions of cylinders 238 and 240. The free ends of lower chain 236 are similarly secured to tie bars 242, only one of which is shown in FIG. 3. A servo-valve 244 controls fluid under pressure applied through lines 246 and 248 to one of the two cylinders 238 or 240 through manifolds 250 and 252 depending upon the direction of swing desired. The two pistons are moved in synchronism in response to fluid pressure to apply tension in one side of the chains 234 and 236 while relieving tension on the other. Thus gear 230 and in turn column 38 is rotated in response to fluid pressure controlled by servo valve 244.

An additional gear 254 provides information as to the instantaneous position of the column through its range of swinging motion and is thus of lighter weight but greater precision than gear 230. Gear 254 drives pinion 256 which in turn rotates gear 258 as well as pinion 260. Pinion 260 directly turns the shaft of a resolver 262 and a differential transformer mechanism 264. The wires which are diagrammatically illustrated extending from resolver 262 in FIG. 3 correspond to a portion of cable 66 and extend from the machine 24 to the swing system 58 and are connected to the input of the swing amplifier through conductor 68. Similarly, with respect to servo valve 244 and other components shown in FIG. 3, the wires diagrammaticaly shown extending therefrom correspond to the various cables of FIG. 1. The wires extending from servo valve 244 correspond to a portion of cable 48 and cable 60 connecting the output of swing amplifier system 58 to servo valve 244.

Differential transformer mechanism 264 contains a conventional differential transformer including two transformer windings with a central slidable core. Rotation of the gear train including gear 260 results in axial movement of the core in the coils whereby the coil coupling changes producing signals which are transmitted by cable 180 to give a continuous signal representing the departure of the column 38 from a predetermined and preset angular position. The one predetermined angular position is set by rotating knob 236 which is connected to the windings within differential transformer mechanism 264 to shift the windings relative to the core. Rotation of knob 266 while the system is energized provides error or displacement signals which drive the mechanical system to re-establish a null. This is continued until the one predetermined home position already described with respect to FIG. 1 is established. Manifold 226 is connected through block 268 to a servo-valve 270. Servo-valve 270 is adapted to control vertical movement of carriage 34 on column 38. Carriage 34 has secured thereto a vertically movable rack 272 which engages a centrally located freely rotatable gear (not shown) in a vertically removable yoke block 274. The gear in yoke block 274 also engages a rack 276 secured to column 38. Yoke block 274 is driven vertically in guide channels by a pair of hydraulic cylinders 278 and 280 which are differentially actuated by servo-valve 270 through manifolds 379 and 281. As will be clear from a consideration of the drawings or from a consideration of copending application S.N. 43,090 vertical motion of carrier 34 bears a two to one relationship to motion yoke block 274 with respect to the column 38, thus providing substantial vertical movement of carriage 34 for limited piston extension.

A second rack 282 is secured to column 38, as shown in FIGS. 2 and 5. This rack is of light but precise construction to provide information with respect to the instantaneous location of the carriage on the vertical column 38. Rack 282 is in engagement with a gear of sensing mechanism 284 which contains both a resolver and a homing differential transformer similar to the devices already described with respect to the swing system. A knob 286 provides an adjustment for the windings of the differntial transformer while the core is driven in direct correspondence with the vertical position of carriage 34. Similarly the resolver is driven to produce a pair of output voltages characteristic of each position of the carriage. Such resolvers are well konwn, one typical device being a type AY-192-A1 resolver of the Bendix Aviation Corporation.

The manner of mounting carriage 34 on column 38 is illustrated in FIG. 5. Rollers 288 are set at approximately 90° angles and engage wedge-shaped guides 290 which are secured to column 38. Carriage rack 272 and column rack 276 can also be seen in FIG. 5 as can the upper piston 280 which provides vertical carriage movement.

Horizontal movement of arm 32 is produced by a pair of pistons in opposed relationship within housing 292 which is carried by column 38. Control of hydraulic pressure to the pistons in housing 292 is provided by servo-valve 294. Bilateral control of the horizontal pistons is produced in much the same manner as already described with respect to the swing mechanisms in which the two pistons are continuously opposed, thus increasing accuracy of movement and eliminating backlash. The pistons drive a rack and gear combination, the gear being secured to shaft 296, as shown in FIG. 3. Shaft 296 carries gear 298 which is in driving engagement with pinion 300. Pinion 300 is in turn fixed to a drive shaft 302 disposed vertically parallel to column 38 and splined to receive a driving collar 304 carried by carriage 34. Collar 304 includes an integrally formed gear 306 which engages and drives a rack 308 secured horizontally to arm 32. A second rack 311 of greater precision and light weight is mounted on horizontal arm 32 and drives a combined resolver and differential transformer 310 substantially the same as the vertical unit 284. The homing differential transformer has a core driven in response to rack movement and windings adjustable with respect to the core by rotation of knob 312. Thus whenever the homing transformer is applied to the input of horizontal system 50 the arm seeks a home position determined by the adjustment of knob 312. The arm 32 and carriage 34 are free to move vertically because of the splined drive between shaft 302 and collar 304.

The horizontal stick control has a mounting plate 70 secured to the nonfunctional end of arm 32. The mounting plate has a substantially horizontal slot-like aperture to receive stick 62 and permit limited transverse movement. The resilient blade 314 abuts the free end of stick 62 and drives the core of a differential transformer 316. Thus, if the stick 62 is manually urged to the left in FIG. 2, that is away from the grippers, a signal will be generated in transformer 316 through resilient plate 314 and that signal amplified in horizontal system 50 and applied to horizontal servo valve 294. Through this closed loop the arm 32 will follow the commands applied to stick 62. Stick 62 is axially slidable in the mounting sleeve 64 with a pin 318 limiting the axial movement of the stick. Mounting sleeve 64 is pivotally mounted about a central vertical axis so that stick 62 may be rotated or rocked through a limited range. As shown best in FIG. 5 this rotation about a central vertical axis of mounting sleeve 64 actuates differential transformer 320 through a linkage including arm 322 which is pivotally connected to arm 324 to rotate a cam 326 about its axis 328 producing limited axial movemnt of the core within transformer 320. The linkage will normally seek a central or null position requiring manual displacement for actuation.

The operation of grippers 30 in their rotatable support 36 is controlled by a solenoid valve 332 mounted in the base of the machine. A similar valve 333 disposed adjacent valve 332 controls the turning and rotary movements of the gripper head 36. Hydraulic pressure is applied to the actuating devices contained within arm 32 through a pair of flexible lines 334 and 336. For a more complete understanding of the operation of the gripper mechanism and the three auxiliary operating modes FIGS. 6–9 should be considered.

As shown in FIG. 9 gripper 30a is adjustably mounted on arm 337 by screw 339. Arm 337 is in turn adjustably mounted on the hub of a gear 340 by screw 335. Similarly, gripper 30b is adjustably secured to arm 341 by screw 338. Arm 341 is in turn adjustably secured by screw 345 to the hub of gear 346. Gears 340 and 346 are in engagement for movement together in response to reciprocatory movement of gripper rack 348 which engages gear 340 for gripper operation. Reciprocation of rack 348 is effected through the integral upper half 342 of a split sleeve extending rearwardly in the arm 32. The split sleeve portion 342 is connected by pin 344 to tube 350 which extends throughout the major portion of the arm 32. Tubular member 350 terminates in a slidably mounted thrust bearing 351 which abuts a sleeve piston 352. Thus fluid pressure applied through flexible tube 334 passes between sleeve piston 352 and actuator housing 353 to exert a forward pressure on the head end 355 of the sleeve piston 352. Sleeve 350 is urged to the retracted position with respect to the central rod 360 by compressed spring 357, and it is the relative positions of sleeve 350 and rod 360 which determine gripper actuation irrespective of the position relative to the arm 32.

In addition to the opening and closing of jaws 30 the jaws are free to move with the jaw support 356 about its central axis within the gripper head 36. Thus referring once again to FIG. 6, the jaws 30 are supported on a central shaft which carries gripper driving gear 340. This shaft is rotatably supported on frustoconical platform support 356 whereby the entire platform, gears and jaws rotate in response to reciprocatory horizontal movement of rack 358. In order to prevent undesired relative movement of the two jaws during rotation of the jaw, support 356, racks 348 and 358 must move together for wrist action. This is accomplished by mounting sleeve 350 and rack 348 on rack 358 and shaft 360 and urging rack 348 rearwardly with respect to rack 358 through spring 357 so that whenever rack 358 is moved by axial movement of central shaft 360 rack 348 moves therewith unless gripper action is separately called for. Actuation of shaft 360 and its associated mechanism is produced by hydraulic pressure applied through conduit 336 to a piston plate 338 having appropriate fluid-tight seals. Thus when pressure is applied to piston plate 338 through conduit 336 supporting sleeve 339 and shaft 360 move to the left in FIGS. 6 and 7 carrying piston 352, hollow shaft 350 and racks 348 and 358. This movement within arm 32 produces rotary movement of the gripper support. Return motion is provided by spring 361 whenever the hydraulic pressure is relieved.

While rotation about the axis of arm 32 may be controlled as a third independent degree of freedom, in the instant invention fluid pressure when applied through conduit 336 to piston plate 338 is also applied through passageway 362 to chamber 364 producing relative motion of sleeve piston 366 in arm 32. Sleeve piston 366 carries with it a block 369 which is keyed to tubular member 350 and has a roller 363 mounted on pin 365 extending radially outward therefrom. A fixed sleeve 367 is secured in arm 32 and provided with an arcuate slot 368 as illustrated best in FIG. 8 which receives roller 363. Block 369 is mounted between thrust bearings and relative axial movement of the pin and slot produces rotation of block 369 and sleeve 350. Gripper support 36 is rotatably mounted on arm 32 through bearings 370 and is fixed for rotation with tubular member 350. Thus the grippers rotate in response to fluid pressure in line 336. Adjustable stops are provided to limit both the turning and rotary motion of the gripper assembly.

A general diagram of the hydraulic system associated with the machine of FIG. 2 is shown in FIG. 10. The pump 202 is driven from motor 42 which also drives a cooling fan directly associated with radiator 44. A thermostatic valve 372 diverts hydraulic fluid through the radiator in an amount required to maintain an optimum temperature. Returning fluid is discharged into reservoir 208 where it is available for reuse through pump input line 212a. The pump 202 applies fluid under pressure through the filter 210 and a check valve 374 to the entire operating system. Fluid is available through line 212b for operating the gripper closing valve 332 and the gripper swing valve 333 which control the application of fluid pressure through lines 334 and 336 respectively to actuate the various pistons contained within arm 32 for appropriate gripper action.

Fluid from check valve 374 is also applied to a pressure reducing valve 380 and the regulated pressure therefrom is applied to the column swing actuator 382 controlled by solenoid 244, the vertical carriage actuator 384 controlled by solenoid 270 and the horizontal arm actuator 386 controlled by solenoid 294. An overload relief valve 388 is connected between the output of check valve 374 and the return line 212c. This is merely a pressure sensitive valve to prevent excessive pressure on any of the operating valve. A three-way hydraulic safety valve 390 is controlled by a solenoid 392 responsive to various signal sources in the sequence control system and comprises the main control for hydraulic power in the operating system. In the operating position pressure from pump 202 is applied through line 212d to an accumulator tank 206 and to the system through reducing valve 380. In the other nonoperating position fluid under pressure is directly returned from line 212d through a somewhat restricted orifice 394 to the return line 212c, the bypass thus reducing the input pressure in the system below an operating level. A further manually actuated unloading valve 396 is provided for in emergency use or during total shut-down.

*The sequence control circuit*

The operation of the work handling machine for the repetitive performance of predetermined tasks is normally controlled completely by the sequence circuit shown in FIGS. 11A, 11B and 11C. The circuit shown conditions the machine for manual operation or operation from predetermined signal sources. In manual operation the sequence circuit will at the option of the operator actuate tape recording mechanisms to make a permanent record of the manual program for subsequent repetitive operation. When in the playback or automatic mode of operation the input signal to the machine may be derived either from the homing differential transformers or from information previously recorded on the magnetic tapes.

The left-hand portion of FIG. 11A comprises the main controls, time delay and interlock system 400. The right-hand portion of FIG. 11A comprises a stepping system 402 having twelve positions defining twelve operating conditions of the system, as charted in FIGS. 12 and 13. The stepping system controls the logic of control inputs to itself as well as controlling all operations of the associated circuits and mechanisms. The stepping system 402 performs its most important functions during automatic operation of the machine in playing back from a prerecorded program. In playback each of the twelve positions of the stepping system is significant for proper control of the machine in response to the recorded information and for proper operation of the tape mechanisms and safety devices.

FIG. 11B relates principally to the control system 404 for the tape mechanisms 132 and 134. The left-hand portion of FIG. 11C includes the logic control 130 of hydraulic power, while the right-hand portion of FIG. 11C includes the tape sensor circuit 406 and a diagrammatic view of the keyboard 74.

In the main control, time delay, and interlock system separate and independent controls are provided for electric and hydraulic power. A main power relay 408 is actuated by a momentary depression of push button switch 102, normally open relay contacts 410 maintaining the relay 408 in an energized condition. Indicator lamp 412 is energized to indicate the "POWER ON" condition whenever relay 408 is energized. In series with relay 408 and ON push button 102 is normally closed power OFF push button 104 and a normally closed emergency stop push button 414. Any number of emergency stop buttons may be provided along with button 414 and they may be located on the work handling machine 24, on the control console 100 on the work processing machine 28 or wherever required.

Energization of relay 408 in addition to closing contacts 410 also closes contacts 416 which control A.C. power to the electronic circuits of the sequence control assembly 100, contacts 418 which control 110 volt D.C. power to other sequence circuits, and contacts 420 which control 55 volt D.C. power in the sequence assembly. Additionally, contacts are provided on relay 408 for energization of the various electronic systems including the horizontal, vertical and swing systems 50, 54 and 58 and the electronic system 88 and the constant speed capstan motors for tape mechanisms 132 and 134. Closure of contacts 418 makes power available for the sequence stepping circuit but application of power thereto is prevented by the deactuated operating relay 422. Closure of main relay contacts 416 provides power to the heater element 428 which is directly connected to the 110 volt A.C. circuit. Heater 428 provides a time delay following closure of the main relay before the sequencing circuits can be actuated to permit warm-up time for all circuit components, acceleration of the tape capstan motors and general stabilization. When the heater 428 has provided the desired time delay, contact 430 is closed thereby. Extending from the main D.C. bus 424 is a connection to one wafer 426 of the operation selector switch controlled by selector knob 124. This switch must be in the central or start position in order to complete the starting circuit. Closure of time delay contacts 430 and positioning operation selector switch 426 in the central or START position conditions the electronic relay circuit including coil 422 for manual operation in response to momentary closure of "START OPERATE" push button 112.

Whenever ON push button 102 is depressed and sequence select switch 426 is in the start position CAUTION light 110 is immediately illuminated. Upon completion of the time delay provided by heater 428 and contact 430 closes, START light 432 which is contained within push button 112 is energized and illuminated. These two lights indicate to an operator that upon depression of START button 112 the machine will be set in motion and as will be described the machine will immediately go to the HOME position as determined by the home differential transformers 284, 310 and 264. The CAUTION light is intended to remind the operator that in the event there is not a clear and direct path between the present location of the gripper arm 32 and the home position he must take special precaution to avoid any obstacles. Failure to do so would result in possible damage to the machine or to the work processing machine with which it is working.

Upon depression of START OPERATE button 112, relay 422 is energized, closing holding contacts 434 as well as others which will be described. The holding circuit is completed through holding contacts 434, main power contacts 436, stop operate push button 114, manipulator contacts 438, maximum error contacts 440, 442 and 444 and relay coil 422. In parallel with the manipulator failure switch and maximum error contacts are normally closed contacts 446 which are operated by the hydraulic safety valve relay 390 shown in FIG. 11C. The maximum error contacts 440, 442 and 444 are contained respectively in the horizontal, vertical, and swing systems 50, 54 and 56 and are actuated by appropriate sensing coils whenever the output signal of the respective system would call for motion exceeding the maximum power capabilities of the machine 24. As the machine would in that event lose synchronization, the maximum error contacts 440, 442 or 444 will automatically shut the machine down. The manipulator contacts are pressure actuated contacts controlled by pressure in the lines 334 and 336. Upon depression of START switch 112 a STOP OPERATE light 450 is illuminated beneath STOP button 114 to enable an operator to quickly locate that button when necessary. Operation of relay 442 also opens contacts 452 to remove power from heater 428, closes contacts 454 to apply operating power to the sequencing circuitry, closes contacts 456 to provide D.C. power to the remainder of the sequence circuit and closes contacts 458 in the hydraulic logic circuit 130, shown in FIG. 11C.

Having performed the start up operations described above the machine 24 will have returned to a home position and will be prepared either for a completely manual cycle of operation, a recording cycle, or a single or multiple playback sequence, depending upon subsequent operation of sequence selector 124.

As the greatest portion of the sequencing circuitry is employed with continuous playback operation, this will be explained first on the assumption that a program is already recorded on the two tapes. Continuous operation in playback is controlled by the stepping circuit 402, the heart of which is a stepping solenoid 460, which through a mechanical pawl arrangement 462 actuates a bank of twelve cams 464 through a twelve-position cycle. No attempt will be made to illustrate the precise cam shapes or the disposition of the various normally open and normally closed switches about the cam shaft but instead the chart of FIG. 12 completely describes the cam operation.

The twelve cams will be identified with suffixes in this description as they are identified in the left-hand column of FIG. 12. Basically, cam switches $A_1$ and $B_1$ control tape mechanisms #1, $A_2$ and $B_2$, control tape mechanism #2, C, D, and E control the stepping mechanism $M_1$, $M_2$ and $M_3$ control the master relay, R controls the application of tape heads to the various mode systems, and S is a follow-through contact on the stepping switch to insure positive operation of the stepping mechanism. In each row opposite a particular cam designation is a series of twelve boxes. Those which contain a plus sign indicate that in a designated cam position a particular cam is actuated, while in the position identified with a minus sign these switches are deactuated.

The characteristic operations of the two tape mechanisms in each of the twelve cam positions are diagrammed in FIG. 13. In FIG. 13 R designates that the particular tape mechanism is running in the playback condition. r indicates that that particular designated tape head output is applied to the electronic systems 50, 54, 58 and 88 of FIG. 1. Thus that particular tape mechanism is the only one which may be controlling machine 24. However other controls, namely a master relay to be described actually determines whether or not the tape signal is in control of the machine. As is clear from FIG. 1, each tape mechanism 132 and 134 has four distinct heads 144–158 and corresponding heads from both tapes are connected into the respective electronic systems where one or the other is selected in accordance with the table of FIG. 13. S in FIG. 13 indicates that the designated tape mechanism is at a stop or standing still, while W indicates that the particular tape mechanism is energized for rewinding. There is an obvious conjugate symmetry between position 1–6 and position 7–12, that is tape mechanism #1 is rewound, stopped and run 180° out of phase with the same operations in tape mechanism at #2. Thus, if operation were commenced, for example, when the sequencing system was in position #2, tape mechanism #2 would be accelerated to running speed. After a short accelerating time the stepping mechanism shifts to position #3 where tape mechanism #2 is switched to provide the command signals for machine 24. At position #4, tape mechanism #2 assumes control of the machine 24. During the time tape #2 commands, the sequencing system causes tape mechanism #1 to rewind and stop until at position #8 it would begin to run and at position #9 it would be switched and at position #10 would resume control of the machine. Sequential operation from position #10 through #12 controls tape mechanism #2 whereby it is rewound and prepared for still another cycle of operation.

The symbol R/S signifies that the particular tape mechanism may be either running or stopped, depending upon some condition of the entire system. For example, if during a cycle under the control of tape mechanism #2, sequence switch 184 on punch press 28, shown in FIG. 1, was operated, indicating that the punch press was out of synchronization, tape mechanism #2 would assume the alternate stop position at stepping positions #5 and #6. If the anomaly, such as lack of synchronization, is eliminated, the system will commence operation and continue to cycle normally. At positions #7 a further PROGRAM check is performed and the machine will stop if synchronization is lacking.

The stepping circuit

To better understand this sequencing operation stepping circuit 402 will be described in detail. All of the switches associated with the cams 464 are shown in FIG. 11A in the #2 position. The actuated position is indicated with a + sign and the deactuated position with a − sign. Actuation from the #2 to the #3 position is automatic providing only a very short time delay to insure that the #2 tape mechanism which is set into operation in position #2 has an opportunity to accelerate to optimum speed before switching to the #3 position where tape #2 assumes command. Thus upon depression of start button 112 and consequent closure of contacts 456 a circuit is completed through conductor 466, cam relay 468, cam contacts 470(C), cam contacts 472(E), which may be in operation selector switch 474, resistor 476, resistor 478, diode 480, and follow through contact 482(S). Contact 482 is opened each time that stepping mechanism 462 begins to operate and at the same time carry-through contact 484(S) closes, as shown in FIG. 12, to insure complete operation of the stepping mechanism even though the input logic circuit is in transition. Capacitor 486 is disposed in parallel with resistor 476 and the various contacts in order to provide a time delay in the order of .5 second in order to insure adequate acceleration of the tape mechanisms. Network 488 is provided for contact protection. Energization of relay 468 closes contacts 490 which provide energization of the stepping mechanism through coil 460. Network 492 and diode 494 provide contact protection for contacts 490.

Actuation of the stepping mechanism moves the cam assembly to position #3 and actuates the cam switches as indicated in the chart of FIG. 12. In position #3 the R contacts effect switching to tape #2 to control operation of the machine and the stepping mechanism 462 is again automatically actuated after a short time delay by the same circuit which has just been described. Again, the circuit for stepping relay 468 is completed through conductor 466, actuated contacts 470(C), deactuated contact 472(E), operation switch 474, the network including resistors 476 and 478 and diode 480 and follow-through contacts 482(S). In position #4 to which the stepping mechanism moves after approximately a .5 second delay, cams $A_1$ and $B_1$ place tape mechanism #1 in a rewind condition, as shown in FIG. 11B and will be described. In position #4 master relay 584 is positively energized which provides a master control between the tape mechanism and the homing differential transformers, as will also be described in greater detail.

The sequence mechanism is immediately and automatically advanced from position #4 to position #5. The circuit for accomplishing this may be traced through conductor 466, cam relay 468, de-actuated contacts 470(C), actuated contact 496(D), de-actuated contact 498(E), and cam follow-through contacts 482(S). Thus the stepping mechanism is advanced to position #5 in which tape mechanism #1 continues to rewind until tape sensor 140 detects the transparent leader at the end of tape 136, as shown diagrammatically in FIG. 1. When this condition is sensed, relay 500, shown in FIG. 11C is energized, closing contacts 502. Closure of contacts 502 completes a new circuit for stepping relay 468 as follows: From conductor 466 through coil 468, de-actuated contacts 470(C), actuated contacts 496(D), actuated contacts 498(E), de-actuated contacts 504(R) and closed sensor contacts 502 to follow-through contacts 482(S). Thus the stepping mechanism 462 advances cams 464 to position #6 where tape mechanism #1 is immediately stopped. Provided that no anomaly has been detected and the tape mechanism #2 has continued to operate normally, machine 24 will complete a normal operating cycle as recorded on the tape. At the end of a single cycle of operation a unique end of program signal is sensed in the control channel by tape head 158. As shown in FIG. 1 this signal is applied through conductor 98 to electronic system 88 where it is sensed, sorted from other control signals and employed to operate a relay having contacts, the closure of which indicates the end of a prerecorded program. One of these contacts 508 is shown in FIG. 11A. Enclosure within a box of broken lines indicates that the contacts or other elements so enclosed are not contained within the sequence control system but are remotely located within the electronic system 88 or on the machine 24.

Closure of contacts 508 thus indicates the completion of a prerecorded program on tape #2 and effects advancement of the stepping mechanism to position #7. This is accomplished through the following circuit which can be traced through reference to the cam table, FIG. 12. The circuit is from conductor 466 through cam relay 468, unactuated contacts 470(C), unactuated contacts 496(D), normally closed interrupter contacts 410 and end of program contacts 508. If the operation selector control 124 were in the once position, the stepping mechanism would stop at this point and await a further depression of START button 112. However, in the continuous position determined by rotation of operation selector 124, a second cycle of operation will automatically begin provided that the program limit switch 182 determines that a new piece part 20, as shown in FIG. 1, is available for engagement by grippers 30. If a part is available the end of program switch 182 is closed and the stepping mechanism will automatically be actuated to position #8 through the following circuit: From conductor 466, through cam relay 468, through actuated contacts 470(C), through actuated contacts 472(E), sequence switch 512 which is controlled by sequence control knob 120 and is in the playback position, operation selector switch 514 of selector 124 which is in the continuous position, sequence selector switch 516 and end of program switch 182 to interrupter switch 482(S). At position #8 the master relay 584 is positively de-energized by contacts 592($M_2$) so that for at least a short interval the tape command is removed from the machine and the home commands applied to the system.

Stepping operation from positions #8 to #9 to #10 to #11 are produced by precisely the same circuit configurations as already described with respect to the stepping operations from positions #2 to #3 to #4 to #5, namely operation from #8 to #9 is timed by the network including capacitor 486 as is operation from #9 to #10. Actuation from #10 to #11 is completely automatic and immediate. At position #11 stepping operation is controlled by the closure of contacts 518 which are actuated by the #2 tape sensor relay 520. This sensor relay 520 is responsive to tape sensor photocell 142 in the #2 mechanism, as shown in FIG. 11C. Stepping from position #12 to position #1 is under control of a recorded end of program signal on tape #1 in a manner already described, and operation from position #1 to position #2 in the continuous mode is effected by the limit switch 182 associated with the workpieces 20, as already described.

The sole difference between the continuous operation of the stepping circuit just described and operation in the adjacent ONCE position of the sequence selector is termination of stepping operation in position #7 and position #1. This is accomplished through program selector switch 514 which disconnects switch 182 from the stepping circuits whenever knob 124 is moved from the continuous position. Thus when the system is in position #7 or position #1 and selector 124 in ONCE position, depression of START button 112 will close contacts 112b and complete the circuit through actuated contacts 470(C), actuated contacts 472(E), closed program limit switch 182, and follow-through contacts 482(S) to initiate another single cycle. In the event that the end of program signal is not sensed or it is desired to step from cam position #6 or #12 to position #7 or #1, START push button may be depressed, closing contacts 112c and completing a circuit through cam relay 468, deactuated contacts 470(C), deactuated contacts 496(D), closed contacts 510, push button 112c, operation selector switch 511 and follow-through contacts 482(S).

At the extreme right-hand side of FIG. 11A a small D.C. power supply formed of a bridge network of diodes 522 is shown. This network energizes a record light 524, shown in the stepping circuit 402 and also provides D.C. power for portions of the tape control circuits.

Tape mechanism control

Having described the complete stepping operation the effects of the various positions on tape mechanism operation will be described with reference to FIG. 11B. Prior to depression of the start button 112 application of power through contacts 454 will provide A.C. power in bus 526 as well as 110 volt D.C. power in bus 424 and 55 volt D.C. power in bus 544. Thus power will be immediately applied to one of the supply motors 164 or 166, depending upon the state of the stepping mechanism.

Recording of a new program is performed in either position #2 or position #8 of the stepping mechanism and thus upon first initiating playback the stepping mechanism will automatically proceed to either position #5 or position #11. In position #5 prior to commencing playback operation a circuit is completed from bus 526 through operation selector 528, actuated cam contacts 530($B_1$) and unactuated cam contacts 532($A_1$) to the supply motor 164 of tape mechanism #1. Conversely, if recording has been completed in position #8 initiation of a playback cycle will immediately step the mechanism to position #11 where a circuit is completed from bus 526 to operation selector 528, actuated cam contacts 534($B_2$) and unactuated cam contacts 536($A_2$) to the supply motor 166 of tape mechanism #2. Thus depending upon the initial position of the stepping mechanism the appropriate tape will be rewound prior to the depression of the START OPERATE button 112. If the mechanism is in position #5, upon rewinding tape #1 the mechanism is stepped by tape sensor 502 to position #6, as already described. If then the operation selector 124 is in the CONTINUOUS position, depression of the OPERATE button 112 will step the mechanism to position #7 where it will automatically step to position #8 to energize tape mechanism #1 for running operation. The circuit completed in position #8 may be traced from 115 volt A.C. bus 526 through operation selector 538, actuated cam contacts 540($B_1$) and actuated cam contacts 542($A_1$) to energize take-up motor 160 of tape mechanism #1. At the same time a circuit is completed from a 55 volt D.C. bus 544 through one of two resistors 546 or 548, a speed selector switch 550, actuated cam contacts 552($B_1$) and actuated cam contacts 532($A_1$) to the supply motor 164. The low level D.C. voltage provided through this circuit acts as a tension means to maintain tape tension during playback. An air valve 554 is also provided in parallel with supply motor 160 but has a series capacitor 556 which prevents energization of the valve when a D.C. voltage is applied. Following a short time delay the stepping mechanism moves to position #9, where signals from heads 144, 148 and 152 are applied through cables 558, 560 and 562, respectively, and at position #10 to the three mode systems 50, 54 and 58.

Master relay operation

Master relay 584 is operative only in the two playback conditions as controlled by operating selector switch 586. Network 588 in parallel with relay 584 and selector 586 provides conventional contact protection. The master relay 584 switches control of the machine 24 in its three modes of operation between the output of one of the tape mechanisms and control by the respective homing differential transformers. When the master relay 584 is actuated, the machine 24 is controlled by the tapes while tape control is positively removed whenever the master relay 584 is deenergized. One principal purpose of this master relay is to protect the entire system from damage and faulty operation resulting from anomalies in the normal sequencing and synchronization. The two particular anomalies disclosed and discussed here are the lack of synchronization of the punch press 28 as sensed by sequence switch 184 and the lack of workpieces 20 as sensed by program switch 182. Any other desired anomaly checks can be performed, as will be understood from the manner of operation of the instant embodiment.

The master relay is positively actuated twice in each complete stepping cycle through actuation of contacts 590($M_3$). This occurs in positions #4 and #10, as shown by FIG. 12. In addition the master relay circuit is positively broken twice in each stepping cycle in positions #2 and #8 by deactuation of contacts 592($M_2$). Thus if the operation selector switch 594 is in the CONTINUOUS position and the sequence selector switch 596 is in the playback position the master relay circuit will be positively energized at positions #4 and #10 from the D.C. conductor 568 through sequence selector switch 596, cam actuated switch 592($M_2$), and cam actuated switch 590($M_3$). Energization of the master relay 584 closes contacts 598 which complete a holding circuit through contacts 598, normally closed machine switch 184a, normally closed anomaly switch 182a and operation selector switch 594. In parallel with normally closed anomaly switch 182a and operation selector switch 594 is a cam actuated contact 600($M_1$). Contact 600($M_1$) is in the deactuated position shown for all positions of the stepping mechanism except positions #1 and #7. Thus irrespective of the condition of anomaly switch 182a during the remainder of the cycle (with the exception of cam positions #2 and #8 where $M_2$ is actuated), contacts 600($M_1$) will maintain energization of master relay 584. Only if the anomaly switch 182a is open in cam position #1 or cam position #7 when contacts 600($M_1$) are also open will the holding circuit be broken and the master relay 584 deenergized.

As will be explained, in the event of deenergization of the master relay the running tape mechanism is immediately stopped and control of machine 24 transferred to the homing differential transformers in position #1 or position #7. In any event, the homing transformers have momentary control of the machine 24 in position #2 and #3 and position #8 and #9 as a result of the master relay controlled by the $M_2$ contacts. In parallel with sequence switch 184a are contacts 602 which are controlled by hydraulic control relay 604 in the hydraulic logic circuit 130, shown in FIG. 11C. Thus whether or not the machine sensor 184 senses an anomaly, namely a lack of workpieces 20, the master relay 584 will not be deenergized unless at the same instant contacts 602 of hydraulic control relay 604 are also open. This will possibly occur at positions #5 and #6 and #11 and #12 in each cycle depending upon the operation of the hydraulic logic circuit.

As is conventional in tape recording and playback mechanisms the supply and take-up motors merely provide tension in the tape during a recording or playback operation, while the capstan which is driven at a constant speed with a substantial flywheel determines the rate of tape movement and insures uniform recording and playback operation. Solenoids 168 and 170 are provided to urge free running rollers against the respective capstans with the tapes driven therebetween. The tape is driven when the respective capstan roller solenoid is energized and in the particular mechanism described whenever that solenoid is deenergized an associated normally actuated brake 578 or 610 is applied to both the supply and take-up shafts. The conditions for actuation of the two capstan solenoids can be checked by reference to FIGS. 12 and 13 with respect to the left-hand portion of the circuit diagram of FIG. 11B.

As already briefly described, in position #2 both tapes are in the R or running condition as shown in FIG. 13, solenoid 168 being energized from the D.C. conductor 568 through actuated contacts 570($B_1$) and 572($A_1$), while roller solenoid 170 is energized through actuated cam contacts 580($B_2$) and 582($A_2$). As can be seen from FIG. 12 the same conditions prevail in position #3, the transition from position #2 to position #3 providing deactuation of the R contacts, whereby the input to the four amplifiers 50, 54, 58 and 88 is switched from the #1 tape head to the #2 tape head. In positions #4 through

7 contacts 572($A_1$) are deactuated and thus the #1 solenoid 168 is deenergized and tape mechanism #1 free to rewind and stop in accordance with the logic of the stepping system. In position #4 solenoid #2 170 remains energized through cam contacts 580($B_2$) and 582($A_2$) and this is stated as a running condition for tape #2 in FIG. 13.

At position #5 or #6 a check is automatically performed for an anomaly in the sequencing of the entire system and this anomaly check determines the actuation of master relay 584. If an anomaly is sensed, that is, if the system is not in condition for further proper operation master relay 584 is deenergized. Thus in position #5 or #6 of the stepping system roller solenoid #2 170 may be energized from conductor 568 through master relay contacts 606, actuated cam contact 608($A_2$) and actuated cam contact 582($A_2$). In the event that an anomaly has been detected it is obvious that contacts 606 controlled by master relay 584 will be deactuated, deenergizing roller solenoid 170 and applying the mechanical brake 610 to tape mechanism #2. The same conditions will continue in positions #5 and #6 as the $A_2$ cam remains actuated while $A_1$ and $B_2$ cams remain deactuated. Before arriving at cam position #7 a signal must be sensed on tape #2 indicating completion of the program and in the event that the program has been stopped this cannot occur. However, whenever the anomaly is removed the program will continue until the end of program signal moves the cam switches to position #7.

In going from position #7 to position #8 the $A_1$ and $B_1$ contacts are actuated initiating running operation of tape mechanism #1 corresponding to operation of tape mechanism #2 in position #2 with the exception that tape #2 is still providing command control of the system. The transition from position #8 to position #9, like that of position #2 to position #3, merely transfers command control to tape head #1 as that mechanism has then accelerated and stabilized, although the #2 mechanism continues to operate.

Following a short time interval the stepping mechanism is advanced to position #10 where contacts 582($A_2$) are deactuated releasing solenoid #2 170 and actuating brake 610 in a manner directly corresponding to the above described operation in position #4. An anomaly check is performed on the system when the mechanism is in position #11 or #12. If operation is normal, mechanism #1 remains operative and roller #1 solenoid 168 remains energized from conductor 564, through master contacts 606, actuated cam contacts 612($A_1$) and actuated contacts 572($A_1$). Contacts 608($A_2$) and 570($B_1$) are deactuated so that in the event of an anomaly which would open master contacts 606 solenoid 168 would be automatically deactuated.

The operation of the supply and take-up motors of both mechanisms in the event of an anomaly can be similarly explained. In cam position #2 both tape mechanisms are running. Thus, as already explained, supply motor 164 for mechanism #1 is provided with a low level D.C. braking voltage through one of the resistors 546 or 548, switch 550 and actuated contacts 552($B_1$) and 552($A_1$). A take-up motor 160 is energized with 115 volt A.C. power through sequence switch 538 and actuated contacts 540($B_1$) and 542($A_2$). Master relay contacts 614 are in parallel with cam contacts 540($B_1$)

Similarly, in position #2 supply motor #2 166 receives a D.C. braking voltage through either resistor 616 or resistor 618 and switch 620 which are in series with actuated cam contacts 622($B_2$) and 536($A_2$). In parallel with cam contacts 622($B_2$) are master contacts 624. A solenoid operated air valve 626 is connected in series with a large capacitor 628 and the series combination is in parallel with the supply motor 166 whereby the valve is deactuated in the running condition when D.C. voltage is applied thereto but is actuated to urge the tape away from the head mechanism when the supply motor is energized with A.C. power. In position #2 take-up motor #2 162 is energized with 115 volt A.C. power through sequence switch 538, actuated cam switch 628 ($B_2$) and actuated cam switch 630($A_2$). Master relay contacts 632 are in parallel with cam contacts 628 ($B_2$). Thus in positions #2, #3, #8 and #9 both tape mechanisms are running as just described. In position #4 or #5 the system logic causes tape mechanism #1 to rewind while tape mechanism #2 remains in operation. Thus in position #4 the $A_1$ contacts are deactuated completing a 115 volt A.C. circuit for supply motor #1 164 from A.C. bus 526 through operation switch 634, actuated contacts 530($B_1$) and deactuated contacts 532 ($A_1$). This also energizes valve solenoid 554 with A.C. power through large capacitor 556. At the same time, low level D.C. braking voltage is applied to take up motor 160 from bus 544 through resistor 636, actuated cam contacts 638($B_1$) and deactuated contacts 542($A_1$). The stepping mechanism automatically proceeds to position #5 where cam $B_2$ is deactuated. The sole effect of this deactuation in the tape drive system is to place operation of supply motor 166 and take-up motor 162 under direct control of the master relay contacts 624 and 632 because of the deactuation of cam contacts 622 ($B_2$) and 628($B_2$). Thus if an anomaly is detected master relay contacts 624 and 632 will be opened, immediately deenergizing tape mechanism #2 and applying brake 610.

Sensing of the transparent tape leader at the beginning of tape #1 advances the cam mechanism from position #5 to position #6 where the $B_1$ cam contacts are deactuated. This means that contacts 530($B_1$) are deactuated, removing rewind power from supply motor 164 and D.C. braking power is removed from take-up motor 160 by deactuation of contacts 638($B_1$). At position #8 both tape mechanisms are operating and at position #9 transfer occurs whereby the #1 tape assumes machine command through the R contacts. The automatic step from position #9 to position #10 deactuates cam contacts $A_2$ and thus at positions #10 or #11 rewind A.C. power is applied to supply motor #2 166 from bus 526 through sequence switch 634, actuated contacts 534($B_2$) and deactuated contacts 536($A_2$). At the same time low level D.C. braking voltage is applied to #2 take-up motor 162 from D.C. bus 544 through resistor 640, actuated cam contacts 642($B_2$) and deactuated cam contacts 630($A_2$). At position #11 or #12 an anomaly check identical to that performed at position #5 or #6 determines further operation of the #1 tape mechanism.

In position #11 the $B_1$ contacts are deactuated whereby contacts 552($B_1$) are open relying upon master relay contacts 644 for continued energization of supply motor 164. Similarly contacts 540($B_1$) are deactuated relying upon master relay contacts 614 for continued operation of #1 take-up motor 160.

To switch to position #12 the transparent leader on the #2 tape has been sensed indicating complete rewinding of that tape and the $B_2$ cam contacts are deactuated including contacts 534($B_2$) which remove rewind power from #2 supply motor 166 and cam contacts 642($B_2$) which remove low level braking voltage from #2 take-up motor 162.

*Control channel signals*

As described with respect to FIG. 1, an operator programs the work handling machine 24 manually and if desired makes a permanent simultaneous record in the four distinct channels of the two magnetic tapes. Three of these channels contain information relating exclusively to the operation of machine 24 in its three basic modes of freedom. The fourth contains momentary information signals placed there by the operator during a recording operation.

While many and diverse signals could be recorded in the fourth channel in the instant embodiment that channel contains only a reference square wave which is modulated to contain four distinct bits of information. The first is operation of the jaws or grippers 30. Depressing a button 82 on the keyboard 74 closes contacts 646 which in turn close the jaws, and depressing another button 82 closes contacts 647 and opens the jaws. This can be accomplished with equal facility by employing a stepping relay and depressing the same button a second time. At the same time that the jaws are actuated a unique signal is recorded in the fourth channel which is sensed by the electronic system 88 during playback, thus repeating the jaw closure and opening performed by the operator during the programming sequence. Push button 648 swings and rotates the jaws through a limited predetermined angle as already described and the actuation of push button 649 returns the grippers to their initial position. Depressing push button 648 actuates relays within electronic system 88 which not only rotate and turn the grippers 30 but also in the recording phase modulate the reference signal in the fourth tape channel so that upon repetitive playback the recorded signal sensed by tape head 156 or 158 may be applied through cables 505 or 506 to the electronic system 88 and comprise the direct equivalent of manual push button operation.

In addition to the gripper closure and gripper turning operations a signal is recorded on the tape at the point in the operating sequence where the sequence anomaly check is to be performed by processing machine switch 184. To do this the operator must release the controls for the machine 24 so that it will lock in the check point position and depress a sequence check switch 650 which is controlled by one of the buttons 82 on panel 74. When this button is depressed during recording it has no effect whatsoever upon the machine but merely actuates a relay in system 88 and records a unique signal in the command channel of the tapes 132 and 134. On playback this signal energizes a relay within electronic system 88 to close a pair of contacts 652 in the hydraulic logic circuit 130. Another push button on the panel 74 actuates certain components of the sequence system to condition the machine 24 to return to a home position. Actuating the Begin-End switch 654 following release of the MANUAL A push button 656 produces a fourth unique signal in the command channel of the tapes indicating the "end of program." This switch 654 is a Begin-End switch which is also depressed to initiate the program although in initiating the program no signal is recorded on the tapes as determinde by circuits of electronic system 88. The remaining push button on control panel 74 actuates MANUAL contacts 656 which in turn control a manual relay 658. Contacts 656 operate in the nature of a deadman control as will be explained, whereby release of the push button 82 controlling contacts 656 will automatically lock the hydraulic system against further motion while continuing the tape recording mechanisms in operation prior to actuation of the push button which conditions the machine to return home.

As a part of the main control and interlock system 400 a pump motor relay 660 is under the control of a push button switch 106. Operation of push button 106 energizes pump relay 660 and closes holding contacts 662. Thus the hydraulic pump 202 is actuated through motor 42 circulating hydraulic fluid in the system shown in FIG. 10. The hydraulic system may operate to this extent whether or not the electronic system is in operation. Normally closed push button 108 deenergizes pump relay 660 terminating operation of the hydraulic system. A light 664 is connected in parallel with relay 660 to indicate energization of the hydraulic system. To obtain the hydraulic pressure provided by pump 202 in the operative portions of the system the hydraulic safety valve 390 must be actuated.

In the manual position of operation selector 124 a circuit is completed through operation selector bank 666 and contacts 668 which are controlled by manual relay 658 whereby voltage is applied to the hydraulic safety valve relay 448 from D.C. bus 424. This permits manual operation of the machine 24 as may be required to test operating cycles, to avoid obstacles in going from the home position and the like.

The remaining operation selection which has not been discussed at any length relates to the recording of a new program on both magnetic tapes. To accomplish this, operation selector 124 and sequence selector 120 are turned to the R position. Under those conditions operation selector bank 474 in the stepping circuit 402 is open thus preventing the automatic advancement of the stepping mechanism from position #2 to positions #3, #4 and #5 and from position #8 to positions #9, #10 and #11 as described with respect to the playback sequence. Recording is normally accomplished in either position #2 or position #8 and if the stepping mechanism is not in one of those positions when recording is contemplated, it will be manually placed in that position. Also before recording, it is necessary to determine that both recording tapes are in the rewound condition. Thus, normally at the end of a prerecorded program, the sequencing system will rest at either position #1, or position #7 having stopped in response to the end of program signal in the last of the repetitive operations of the previously recorded program. With the sequence selector in the start position, depression of operate push button 112 will advance the stepping mechanism 462 through a circuit from conductor 466 through stepping relay 468, actuated contacts 470(C), actuated contacts 472(E), operate switch 112b, and the program limit switch 182. In the start position of selector switch 124, the automatic stepping from positions #2 to #3 and from #3 to #4 will occur through selector bank 474 whereby rewinding of tape #1 is automatically initiated. Following rewinding the system will rest at position #6 and by depressing the operate button once again the stepping mechanism will be advanced through the circuit 466, stepping relay 468, unactuated contacts 470 (C), unactuated contacts 496(D) and operate push button 112c. To advance from position #7 to position #8 requires a further depression of operate push button 112, which will complete the circuit from conductor 466 through stepping relay 468, actuated contacts 470(C), actuated contacts 472(E) and anomaly switch 182. The stepping mechanism automatically proceeds from position #8 to position #10 and automatically to #11 where a circuit is completed through contacts 497 from conductor 466 through cam relay 468, deactuated contacts 470(C), actuated contacts 496(D), actuated contacts 498(E), actuated contacts 504(R) and actuated tape leader sensor contacts 518. The same circuit would actuate the stepping mechanism from position #5 to position #6 except that contacts 504(R) are deactuated completing the circuit through sensor contacts 502. Thus prepared for recording the system rests in position #12. If the operation selector 124 and sequence selector 120 are switched to the RECORD position recording can begin only upon actuating the cam mechanisms to position #2 or position #8. The mechanism will step from position #12 to position #1 or from position #6 to position #7 in the RECORD condition upon depression of a keyboard button, which completes the stepping circuit from conductor 466 through relay 468, deactuated contacts 470(C), deactuated contacts 496(D), manual button 497, operation selector switch 514, sequence selector switch 516, manual relay contacts 499, cam contacts 501(R), sensor contacts 502 or 518 and follow-through contacts 482(S). The stepping mechanism is automatically actuated from position #1 to #2 and from position #7 to #8 by release of the Begin-End push button, which closes normally closed contacts 499.

*Hydraulic logic circuit*

Referring once again to the hydraulic logic circuit in FIG. 11C, it will be noted that when operation switch 670 is in the start position, no power is applied to hydraulic safety valve relay 390 until the start button 112 is depressed to close contacts 458. When this occurs, voltage is applied to a circuit including hydraulic control relay 604. Hydraulic control relay 604 is incorporated in a capacitor multiplier circuit intended to provide a predetermined time delay in the operation of relay 604. One termination of winding 604 is connected to the negative D.C. bus 424 through the operation selector switch 670 in the START position and relay contacts 458. The other terminal of relay coil 604 is connected to the collector terminal of a transistor 672. The emitter of transistor 672 is connected at the mid point of a resistive network including a small emitter resistor 674 and a relatively large bias resistor 676. The base of transistor 672 is connected in an input control network including a relatively large base-collector resistor 678, a delay capacitor 680 and a resistor 682 in series with normally open machine sensor switch 684 which is a part of the anomaly detector 184 on punch press 28. This normally open sequence switch 684 is in series with the parallel combination of relay contacts 652 disposed in electronic system 88 and closed in response to a tape recorded sequence check signal and holding contacts 686 which are actuated by hydraulic control relay 604.

Whenever the base of transistor 672 is biased at a voltage approximating the emitter voltage the current in the emitter-base path biases the transistor for conduction and provides sufficient current to energize relay coil 604. However when voltage is first applied to the circuit, discharged capacitor 680 produces an effective shunt whereby the base is momentarily biased negatively with respect to the emitter and thus the transistor does not conduct. As the capacitor 680 is charged the transistor is biased for conduction and coil 604 is energized. This can only occur when the sequence check switch 684 is open. If check switch 684 is closed an effective shunt for capacitor 680 is provided through resistor 682 rendering the transistor nonconductive and maintaining the hydraulic control relay 604 deenergized through the normally closed holding contacts 686.

In either ONCE or CONTINUOUS playback conditions operation selector switch 124 positions switch bank 670 to complete a circuit to sequence switch 688 and when this switch is in the playback position the transistor collector circuit is also completed. Thus if sequence switch 684 is open, coil 604 is energized after a short time delay. Energization of coil 604 closes contacts 690 reenergizing hydraulic safety valve 390 rendering the mechanical system responsive to any input signals to the three mode systems 50, 54 and 58. As already described the master relay 584 when energized provides tape inputs for the three mode controls and when deenergized provides transformer inputs for the three mode systems. Relay 692 selects between the three manual control differential transformers and the three homing differential transformers and is effective whenever the master relay is deenergized. Through contacts not shown relay 692 switches between the manual inputs to mode systems 50, 54 and 58 as applied through cables 72, 80 and 68 and the homing signals applied through inputs 176, 178 and 180 in FIG. 1.

In the start position of operation selector 124 the input transformer relay 692 is not energized and thus the homing transformers position the arm of machine 24 in the preset home position. As already described, if it becomes apparent that motion to this home position will encounter an obstacle the operator must quickly switch to the manual position of operation selector 124 in which operation selector switch 666 energizes input selector relay 692 as well as providing available power for hydraulic safety valve 390 through manual contacts 668. A manual light 694 indicates actuation of relay 692 and, consequently, the fact that manual inputs are applied to the three operating systems 50, 54 and 58.

If the hydraulic logic circuit is conditioned for single or continuous playback through operation selector switch 670 and sequence selector 688, the hydraulic control valve relay 604 will apply hydraulic power to the safety valve 390 while removing energization of input selector relay 692 through actuation of normally closed contacts 696. Thus the hydraulic safety valve 390 will be energized at all times in the playback condition unless at the time the machine checking contacts 652 are closed by the electronic system 88 in response to a prerecorded sequence check signal, sequence check switch 684 on machine 28 is also closed. In this event relay 604 will be immediately deenergized and, even though the signal from the tape terminates, will be held deenergized by normally closed holding contacts 686. At the same time master relay 584 will be deenergized by the deactuation of normally open hydraulic control valve contacts 602 (see FIG. 11B) which are in parallel with normally closed, but now open, sequence check switch 184a. Upon elimination of the anomaly detected by the sequence control switch the master relay will be immediately energized through contacts 184a and normally closed contacts 698 which are controlled by the hydraulic control relay 604. Thereafter the circuit is held through holding contact 598 and the master relay 584. When the master relay closes, the tape mechanism immediately accelerates to operating speed. To insure that the tape is accelerated prior to operation of the hydraulic system the time delay provided by the capacitor multiplier circuit delays actuation of the hydraulic control valve 604 for a period of time in the order of one second.

In the RECORD position the hydraulic control relay 604 is not normally employed. A circuit is completed to the hydraulic safety valve 390 from D.C. bus 424 through main electronic contacts 458, operation selector switch 670, sequence selection switch 700 and cam contacts 702($M_2$). This will only be true when the cam mechanism is in either position #2 or position #8, as already discussed. This circuit will momentarily energize hydraulic safety valve 390 through normally closed contacts 704 under the control of input selection relay 692. Thus in the RECORD position the hydraulic safety valve 390 is energized while input selection relay 692 remains deenergized and the system will go to the HOME position. However, thereafter upon initiation of manual operation manual relay contacts 668 will be closed energizing the input selector relay 692, opening contacts 704 and closing holding contacts 706. Thereafter release of the manual push button will open contacts 668, deenergizing the hydraulic safety valve 390 while energization of input selector relay 692 will be maintained. Thus the operator may stop and start manual operation as often as required during a recording cycle without returning to the HOME position or terminating an operative cycle.

However, immediately prior to completion of the desired work cycle, after all normal work functions are performed, the operator may depress the prepare to return home button 82 which controls contacts 708 and energizes the hydraulic control relay 604. The relay 604 is maintained in energized condition by holding contacts 710 which in turn through contacts 690 maintain hydraulic safety valve 390 energized. Actuation of relay 604 also opens normally closed contacts 696 so that the holding circuit for input selector relay 692 is broken. Thereafter release of manual push button 668 will immediately deactuate input relay 692 and return it to home condition. The machine will therefore return to the home position, recording characteristic signals in the three basic tape channels as it moves.

The tape sensor circuit is also a part of the sequence system 100 and is shown in FIG. 11C. This is a transistor amplifier circuit connected between the positive and negative D.C. buses. Photocell 140 associated with tape mechanism #1 is connected in the collector-base circuit of a transistor 712 which is connected in a common emitter configuration. A large resistor 714 is connected from the positive supply to the base while a small resistor 716 is connected between the positive supply terminal and the emitter. Thus when the tape is disposed in the photocell path, photocell 140 is darkened to provide a high impedance. This reduces the emitter-base current in transistor 712 providing cut-off in the collector circuit and thus preventing current flow in the collector path from the positive bus through small resistor 716, the emitter-collector connections, and sensor relay 500. When the transparent leader is sensed the impedance of photocell 140 drops drastically increasing the emitter-base bias producing current in relay 500 and closing the various contacts controlled thereby. The effect of this operation has already been explained.

Photocell 142 of tape mechanism #2 operates in an identical manner. When the photocell is dark, transistor 718 is biased for nonconduction as a result of resistor 720 and resistors 716 and 722. The transparent leader on tape #2 permits light to lower the impedance of photocell 142 which through resistor 726 lowers the base potential producing substantial emitter-base current, thus biasing transistor 718 for conduction. Tape #2 sensor relay 520 is thus actuated, actuating the associated contacts for the purposes already described.

One particular sequence control system especially adapted for operation with a work handling machine as described in copending application Ser. No. 43,090 has been disclosed and illustrated in great detail. However the detailed description is for illustrative purposes only and the basic teaching of this application will obviously be applicable in a wide diversity of situations. The sequence control system is adapted for controlling any system or device in which it is desired to manually record a predetermined program of any arbitrary nature with any number of modes or degrees of freedom, after which it is desired to repetitively perform the same operations or perform the same program with adequate safeguards for synchronization, and detection of anomalies and discrepancies in operation. Immediate availability of the recorded program as well as immediate availability of the system for the recording of additional programs are additional important features.

Without further elaboration, the foregoing will so fully explain the character of our invention that others may, by applying current knowledge, readily adapt the same for use under varying conditions of service, while retaining certain features which may properly be said to constitute the essential items of novelty involved, which items are intended to be defined and secured to us by the following claims.

We claim:
1. Apparatus for recording and reproducing a program of information comprising a plurality of record media adapted to record chronologically a program of information, means for chronologically recording substantially identical information on each of said record media, means for sensing said recorded information on each of said record media, control means for energizing said means for recording to substantially simultaneously record said information on said media and alternatively for energizing said sensing means for sensing the information on each of said record media in a predetermined sequence, means for resetting each of the record media with respect to the sensing means for sensing the beginning of the program of information on the respective record media, and means responsive to the condition of said record media and the chronological sensing of one of said record media to actuate said control means and initiate sensing of another of said record media when the chronological program of said one record media has been substantially completed.

2. Apparatus for controlling the operation of a machine comprising motive means for driving said machine in response to recorded information, a plurality of elongate record media adapted to receive a sequential program of information for activating said motive means with recorded information, means for chronologically recording substantially identical information on each of said elongate record media, means for externally actuating said motive means to drive said machine through an arbitrary program of operation, means responsive to the operation of said machine for generating signals uniquely defining said program of operation, said signals being applied to and recorded by said recording means on said record media, means for sensing said recorded information on each of said record media, and control means for energizing said means for recording to simultaneously record said information on said media or for alternatively energizing said sensing means for sensing the information on each of said recorded media in a predetermined sequence to actuate said machine.

3. Apparatus for recording and reproducing a program of information comprising a plurality of record media adapted to record chronologically a program of information, means for chronologically recording substantially identical information on each of said record media, means for sensing said recorded information on each of said record media, control means for energizing said means for recording to substantially simultaneously record said information on said media and alternatively for energizing said sensing means and sensing the information on each of said record media in a predetermined repeatable sequence, and auxiliary means producing a constant information signal during a predetermined interval between sensing of alternate record media.

4. In apparatus including a machine operated in coordination with other instrumentalities and a control device for automatically actuating said machine through a predetermined program recorded chronologically on a moving record medium, the improvement comprising means for checking the condition of said instrumentalities at a predetermined point in the program of said machine and determining an anomaly in said operation, means responsive to said checking means for maintaining said machine in the condition at said predetermined point in said program whenever said checking means determines an anomaly exists, means responsive to said checking means for stopping said moving medium whenever said checking means determines an anomaly exists, means responsive to said checking means for restarting said moving medium whenever said anomaly is eliminated, and means initiating operation of said machine through the remainder of said program following a predetermined delay after said moving medium is restarted during which said moving record medium accelerates.

5. In apparatus including a work processing instrumentality, a work handling machine adapted to operate in conjunction with said work processing instrumentality, motive means for driving said work handling machine, feedback means for sensing the instantaneous condition of said work handling machine and generating a signal corresponding to said condition, a movable record medium having a chronological program of information recorded thereon corresponding to a program of conditions for said work handling machine, sensing means for sensing said recorded program and generating a signal corresponding to the desired instantaneous position of said machine, and error signal means generating an error signal in response to a comparison of the signal from said feedback means and the signal from said sensing means, said error signal means effectively driving said work handling machine until said signals correspond and said error signal is nullified, the improvement comprising means for checking the condition of said work processing instrumentality at a predetermined point in the program of said machine and determining the presence of a possible anomaly in said operation, means responsive to said checking means for terminating the operation of said machine in response to said error signal whenever said checking means determines an anomaly exists and for stopping said record medium, and auxiliary means generating control information, the output of said auxiliary means controlling said work handling machine as long as said anomaly persists.

6. Apparatus for operation in a system including a work handling machine coordinated with a work processing instrumentality, said apparatus comprising motive means for driving said work handling machine; actuating means for actuating said motive means through an arbitrary program of operation; feedback means sensing the program of operation of said machine and generating a signal representative thereof; auxiliary means generating signals corresponding to one operative condition of said machine; program recording apparatus comprising a record medium, means energized from said feedback means for making a record characteristic of said program, and sensing means for sensing said record medium and generating signals corresponding to said program, means for switching said motive means between control by said actuating means and control by said sensing means, error means energized by said feedback means and said sensing means to generate a signal corresponding to the relationship therebetween, said signal effectively actuating said motive means to drive said machine through said program, and means checking the program of operation under control of said error means for an anomaly in the system to switch control of said motive means to said auxiliary means in the event of said anomaly.

7. Apparatus for operation in a system including a work handling machine coordinated with a work processing instrumentality, said apparatus comprising motive means for driving said work handling machine; actuating means for actuating said motive means through an arbitrary program of operation; feedback means sensing the program of operation of said machine and generating a signal representative thereof; auxiliary means generating signals corresponding to one operative condition of said machine; program recording apparatus comprising a record medium, means energized from said feedback means for making a record characteristic of said program, and sensing means for sensing said record medium and generating signals corresponding to said program, means for switching said motive means between control by said actuating means and control by said sensing means, error means energized by said feedback means and said sensing means to generate a signal corresponding to the relationship therebetween, said signal effectively actuating said motive means to drive said machine through said program, means for applying said auxiliary means to said motive means at a predetermined point in said program to produce said one operative condition of said machine, and means checking the program of operation under control of said error means for an anomaly in the system to switch control of said motive means to said auxiliary means in the event of said anomaly.

8. Apparatus for operation in a system including a work handling machine coordinated with a work processing instrumentality, said apparatus comprising motive means for driving said work handling machine; actuating means for actuating said motive means through an arbitrary program of operation; feedback means sensing the program of operation of said machine and generating a signal representative thereof; auxiliary means generating signals corresponding to one operative condition of said machine; program recording apparatus comprising a record medium, means energized from said feedback means for making a record characteristic of said program, and sensing means for sensing said record medium and generating signals corresponding to said program, means for switching said motive means between control by said actuating means and control by said sensing means, error means energized by said feedback means and said sensing means to generate a signal corresponding to the relationship therebetween, said signal effectively actuating said motive means to drive said machine through said program, means for applying said auxiliary means to said motive means at a predetermined point in said program to produce said one operative condition of said machine, means checking the program of operation under control of said error means for an anomaly in the system to switch control of said motive means to said auxiliary means in the event of said anomaly, and means switching control of said motive means to said error means whenever said anomaly is eliminated.

9. In apparatus including a machine and a control device for automatically actuating said machine through a predetermined program recorded chronologically on a moving record medium, the improvement comprising an interval of constant information recorded on said medium to produce a quiescent interval in said machine, means for sensing the operation of said apparatus during said quiescent interval and determining an anomaly in said operation, means responsive to said sensing means stopping said moving record medium in the event of an anomaly, auxiliary signal means responsive to said sensing means and extending said quiescent interval after said record medium has stopped, and means releasing said record medium and said machine automatically whenever said anomaly is corrected to continue said program.

10. Apparatus for controlling the operation of a machine having motive means for driving said machine through an arbitrary program, said apparatus comprising record means adapted to receive and record a chronological program of information, sensing means adapted to sequentially sense said program of information and actuate said machine in accordance therewith, means for manually actuating said motive means to drive said machine through a desired program, means generating an information signal characteristic of said desired program as said machine is manually actuated, means for recording said information signal chronologically on said record means, means for selectively associating in operative relationship said sensing means or said means for recording with said record means, auxiliary means actuating said machine to one predetermined condition, and means switching from said sensing means to said auxiliary means at the end of said program of information.

11. Apparatus for controlling the operation of a machine having motive means for driving said machine through an arbitrary program, said apparatus comprising record means adapted to receive and record a chronological program of information, sensing means adapted to sequentially sense said program of information and actuate said machine in accordance therewith, means for manually actuating said motive means to drive said machine through a desired program, means generating an information signal characteristic of said desired program as said machine is manually actuated, means for recording said information signal chronologically on said record means, means for selectively associating in operative relationship said sensing means or said means for recording with said record means, manually actuated means for recording a unique signal on said record means at the end of said program, auxiliary means actuating said machine to one predetermined condition, and means responsive to said unique signal switching from said sensing means to said auxiliary means at the end of said program of information.

12. Apparatus for controlling the operation of a work handling machine in cooperation with a work processing machine, said work handling machine having motive means for driving said work handling machine through an arbitrary program of work supporting positions, said apparatus comprising record means adapted to receive and record a chronological program of information defining a sequential pattern of work supporting positions, sensing means adapted to sequentially sense said program of information and actuate said machine in accordance therewith, means for manually actuating said motive means to drive said machine through a desired program of work supporting positions, means generating an information signal characteristic of said desired program as said machine is manually actuated, means for recording said information signal chronologically on said record means, means for selectively associating said sensing means or said means for recording with said record means in an operative relationship, auxiliary means actuating said machine to one predetermined work supporting position, and means switching from said sensing means to said auxiliary means at the end of said program of information.

13. Apparatus for controlling the operation of a work handling machine in cooperation with a work processing machine, said work handling machine having motive means for driving said work handling machine through an arbitrary program of work supporting positions, said apparatus comprising record means adapted to receive and record a chronological program of information defining a sequential pattern of work supporting positions, sensing means adapted to sequentially sense said program of information and actuate said machine in accordance therewith, means for manually actuating said motive means to drive said machine through a desired program of work supporting positions, means generating an information signal characteristic of said desired program as said machine is manually actuated, means for recording said information signal chronologically on said record means, means for selectively associating said sensing means or said means for recording with said record means in an operative relationship, auxiliary means actuating said machine to a predetermined work supporting position prior to the beginning of said manual program, and means switching from said sensing means to said auxiliary means at the end of said program.

14. Apparatus for controlling the operation of a work handling machine in cooperation with a work processing machine, said work handling machine having motive means for driving said work handling machine through an arbitrary program of work supporting positions, said apparatus comprising record means adapted to receive and record a chronological program of information defining a sequential pattern of work supporting positions, sensing means adapted to sequentially sense said program of information and actuate said machine in accordance therewith, means for manually actuating said motive means to drive said machine through a desired program of work supporting positions, means generating an information signal characteristic of said desired program as said machine is manually actuated, means for recording said information signal chronologically on said record means, auxiliary means actuating said machine to a predetermined work supporting position, means energizing said motive means from said auxiliary means prior to said manual program, manually actuated means for recording a unique signal on said record means at the end of said program, and means responsive to said unique signal switching the actuation of said motive means from said sensing means to said auxiliary means at the end of said program of information.

15. A sequence control device for controlling a system including a work handling machine coordinated with a work processing instrumentality in accordance with a prerecorded program substantially identically impressed upon a plurality of elongate record media and sensed by sensing means adapted to actuate said machine, said device comprising an actuator, switch means driven by said actuator for controlling said machine, said sensing means and the input to said actuator, said switch means having a plurality of conditions, each corresponding to an media energizing said actuator when in said new condition to actuate said switch means to a different condition and stop said one media, said end signal on said other media energizing said actuator to actuate said switch means from said different condition to said first condition in which said checking means is operatively connected to said actuator for a subsequent cycle.

16. The sequence control device of claim 15 wherein said switch means assumes additional conditions between said first condition and said one condition, said switch means being actuated to a second condition by said actuator following a predetermined time interval in said first condition, said switch means energizing said sensing means for said one media in said second condition, and said switch means being actuated to a third condition only after a predetermined time interval in said second condition, said switch means operatively connecting the rewind means for said other media in said third condition, similar intermediate conditions being provided between said subsequent condition and said new condition whereby said sensing means for said other media actuates said machine only after a predetermined interval following actuation of the winding means, and the rewind means for said first media is actuated only after a predetermined time interval thereafter.

17. The sequence control device of claim 15 wherein an auxiliary positioning means is provided for said machine, and said switch means operatively connects said auxiliary means to said machine in said subsequent condition or said first condition in the event that an anomaly is sensed.

18. The sequence control device of claim 16 wherein an auxiliary positioning means is provided for said machine, and said switch means operatively connects said auxiliary means to said machine in said subsequent condition or said first condition in the event that an anomaly is sensed.

19. The sequence control device of claim 17 wherein the position of said machine as provided by said program when said switch means assumes said subsequent and said first conditions is substantially identical to the position defined by said auxiliary positioning means.

20. The sequence control device of claim 15 wherein additional conditions of said switch means are provided between said one condition and said another condition and between said new condition and said different condition, means being provided for testing said system for anomalies, said means actuated by said switch means in said additional conditions, and locking said machine and stopping said sequence device and said winding means so long as an anomaly is detected.

21. The sequence control device of claim 16 wherein additional conditions of said switch means are provided between said one condition and said another condition and between said new condition and said different condition, means being provided for testing said system for anomalies, said means actuated by said switch means in said additional conditions, and locking said machine and stopping said sequence device and said winding means so long as an anomaly is detected.

22. A sequence control device for controlling a system including a work handling machine coordinated with a work processing instrumentality in accordance with a prerecorded program substantially identically impressed on record media, said device comprising an actuator, a group of cam means having rotatably mounted cams and driven by said actuator through a plurality of positions each corresponding to an operating condition of said system, a plurality of elongate record media, means sensing the program on each of said media and adapted to operate said machine through said program, winding means driving each of said media through its program in operative relationship with the respective sensing means, rewind means for resetting each of said media following the end of its program, sensor means at the beginning of each of said media to generate a signal indicating a reset condition of said media, an end signal being recorded on each of said media indicating the end of the program recorded thereon, means checking the operation of said system to sense an anomaly in the operation thereof, a signal being generated by said checking means in the absence of an anomaly to energize said actuator to actuate said cam means from a first position to one position in which said cam means actuates the winding means for one of said media, energizes the sensing means for said one media to actuate said machine, and controls the rewind means for the other of said media, the sensor means of said other media energizing said actuator when in said one position to actuate said cam means to another position and stop said other media, said end signal on said one media energizing said actuator to actuate said cam means from said another position to a subsequent position in which said checking means is operatively connected to said actuator, said work handling machine and said one winding means being stopped whenever an anomaly is sensed by said checking means, a signal being generated by said checking means in the absence of an anomaly to energize said actuator to actuate said cam means from said subsequent position to a new position in which said cam means actuates the winding means for the other of said media, energizes the sensing means for said other media to actuate said machine, and controls the rewind means for said one media, the sensor means of said one media energizing said actuator when in said new position to actuate said cam means to a different position and stop said one media, said end signal on said other media energizing said actuator to actuate said cam means from said different position to said first position in which said checking means is operatively connected to said actuator for a subsequent cycle.

23. A sequence control device for controlling a system including a work handling machine coordinated with a work processing instrumentality in accordance with a pre-recorded program substantially identically impressed upon a plurality of elongate record media and sensed by sensing means adapted to operatively actuate said machine, each of said record media being provided with winding means driving said media through the recorded program in operative relationship with said sensing means and rewind means for resetting each of said media following the end of its program, each of said media having sensor means at the beginning of the recorded program to generate a signal indicating said media is reset for a subsequent program cycle, said sequence control device comprising an actuator, switch means driven by said actuator for controlling said machine, said sensing means and the input to said actuator, said switch means having a plurality of conditions, each corresponding to an operating condition of said system, means generating an end signal with respect to each of said media indicating the end of the program recorded thereon, means checking said instrumentality to sense an anomaly in the operation thereof, a signal being generated in response to said checking means in the absence of an anomaly to actuate said switch means from a first condition to one condition in which said switch means actuates the winding means for one of said media, energizes the sensing means for one media to actuate said machine, and controls the rewind means for the other of said media, the sensor means of said other media energizing said actuator when in said one condition to actuate said switch means to another condition and stop said other media, said end signal on said one media energizing said actuator to actuate said switch means from said another condition to a subsequent condition in which said checking means is operatively connected to said actuator, said work handling machine and said one winding means being stopped whenever an anomaly is sensed by said checking means, a signal being generated by said checking means in the absence of an anomaly to energize said actuator to actuate said switch means from said subsequent condition to a new condition in which said switch means actuates the winding means for the other of said media, energizes the sensing means for said other media to actuate said machine, and control the rewind means for said one media, the sensor means of said one media energizing said actuator when in said new condition to actuate said switch means to a different condition and stop said one media, said end signal on said other media energizing said actuator to actuate said switch means from said different condition to said first condition in which said checking means is operatively connected to said actuator for a subsequent cycle.

24. The sequence control device of claim 23, including means for recording said program on said two record media, and control means for switching to a record condition in which said two winding means are simultaneously actuated to generate two substantially identical programs, and including manual means for driving said machine through an arbitrary program.

25. The sequence control device of claim 17 including means for recording said program on said two record media, and control means for switching to a record condition in which said two winding means are simultaneously actuated to generate two substantially identical programs, and including manual means for driving said machine through an arbitrary program.

26. The sequence control device of claim 25 wherein said auxiliary positioning means is operatively connected to said machine at the beginning and the end of said arbitrary program.

References Cited by the Examiner

UNITED STATES PATENTS

| | | | |
|---|---|---|---|
| 1,325,825 | 12/1919 | Bailey | 242—55.12 |
| 2,492,731 | 12/1949 | Branson | 318—162 X |
| 2,648,252 | 8/1953 | Stancliff et al. | 318—162 X |
| 2,693,127 | 11/1954 | Ortman | 318—162 X |
| 2,698,410 | 12/1954 | Madsen et al. | 318—162 |
| 2,755,422 | 7/1956 | Livingston | 318—162 |
| 2,937,365 | 5/1960 | Peaslee | 318—39 X |
| 2,998,560 | 8/1961 | Mottu | 318—162 X |

ORIS L. RADER, *Primary Examiner.*

D. J. SHREWSBERRY, T. LYNCH,
*Assistant Examiners.*